(12) United States Patent
Watanabe

(10) Patent No.: US 10,649,405 B2
(45) Date of Patent: May 12, 2020

(54) DIGITAL HOLOGRAPHIC IMAGING APPARATUS AND ILLUMINATION APPARATUS

(71) Applicant: OLYMPUS CORPORATION, Hachioji-shi, Tokyo (JP)

(72) Inventor: Satoshi Watanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 138 days.

(21) Appl. No.: 15/843,881

(22) Filed: Dec. 15, 2017

(65) Prior Publication Data

US 2018/0107158 A1    Apr. 19, 2018

Related U.S. Application Data

(63) Continuation of application No. PCT/JP2015/003424, filed on Jul. 7, 2015.

(51) Int. Cl.
*G03H 1/10* (2006.01)
*G03H 1/04* (2006.01)
(Continued)

(52) U.S. Cl.
CPC ......... *G03H 1/0402* (2013.01); *G01N 21/453* (2013.01); *G03H 1/00* (2013.01);
(Continued)

(58) Field of Classification Search
CPC ...... G03H 1/00; G03H 1/0402; G03H 1/0465; G03H 1/041; G03H 2223/16; G02B 6/34
(Continued)

(56) References Cited

U.S. PATENT DOCUMENTS 6,246,495 B1    6/2001  Yamaguchi
7,798,699 B2 *  9/2010  Laitinen .................. G09F 13/18
                                                    349/65

(Continued)

FOREIGN PATENT DOCUMENTS

JP          3471556 B2    12/2003
JP       2013228735 A    11/2013
(Continued)

OTHER PUBLICATIONS

International Search Report (ISR) and Written Opinion dated Oct. 13, 2015 issued in International Application No. PCT/JP2015/003424.

(Continued)

*Primary Examiner* — Audrey Y Chang
(74) *Attorney, Agent, or Firm* — Holtz, Holtz & Volek PC

(57) ABSTRACT

Provided is a digital holographic imaging apparatus, comprising: an illumination portion (10) having an illumination light emission surface (32i) for emitting coherent light of a specific wavelength as illumination light toward an object (1) side relative to the illumination light emission surface (32i), and a reference light emission surface (32r) for emitting the coherent light, as reference light, in a direction opposite to the illumination light; and an image sensor (50) located on the reference light emission surface (32r) side of the illumination portion (10) and imaging an interference pattern between object light having been modulated by the object (1) and passed through the illumination portion (10) and the reference light of the illumination light, the image sensor (50) having a pixel array (51) comprising two-dimensionally aligned pixels.

13 Claims, 19 Drawing Sheets

(51) Int. Cl.
 *G03H 1/00* (2006.01)
 *G01N 21/45* (2006.01)

(52) U.S. Cl.
 CPC ......... *G03H 1/0443* (2013.01); *G03H 1/0465* (2013.01); *G03H 1/041* (2013.01); *G03H 2001/0413* (2013.01); *G03H 2001/0445* (2013.01); *G03H 2001/0447* (2013.01); *G03H 2001/0452* (2013.01); *G03H 2001/0458* (2013.01); *G03H 2001/0469* (2013.01); *G03H 2222/12* (2013.01); *G03H 2222/31* (2013.01); *G03H 2222/34* (2013.01); *G03H 2222/45* (2013.01); *G03H 2223/13* (2013.01); *G03H 2223/16* (2013.01); *G03H 2223/18* (2013.01); *G03H 2223/20* (2013.01); *G03H 2223/22* (2013.01); *G03H 2223/23* (2013.01); *G03H 2225/32* (2013.01)

(58) Field of Classification Search
 USPC ................. 359/1, 10, 35, 34, 11, 9; 348/79; 349/65; 385/37
 See application file for complete search history.

(56) References Cited

U.S. PATENT DOCUMENTS

| | | |
|---|---|---|
| 2005/0046863 A1 | 3/2005 | Millerd et al. |
| 2010/0253986 A1 | 10/2010 | Awatsuji et al. |
| 2013/0278981 A1 | 10/2013 | Huys et al. |
| 2013/0278982 A1 | 10/2013 | Huys et al. |
| 2013/0286678 A1 | 10/2013 | Sugiyama et al. |
| 2013/0293697 A1* | 11/2013 | Sun ...................... G02B 21/361 348/79 |
| 2014/0063578 A1* | 3/2014 | Pyun .................... G03H 1/0476 359/10 |
| 2015/0063753 A1* | 3/2015 | Evans ...................... G02B 6/34 385/37 |
| 2015/0300803 A1* | 10/2015 | Horimai ............... G03H 1/0443 356/458 |

FOREIGN PATENT DOCUMENTS

| | | |
|---|---|---|
| JP | 2013228736 A | 11/2013 |
| WO | 2009066771 A1 | 5/2009 |
| WO | 2011149405 A1 | 12/2011 |
| WO | 2013047709 A1 | 4/2013 |
| WO | 2013080488 A1 | 6/2013 |
| WO | 2014088089 A1 | 6/2014 |

OTHER PUBLICATIONS

Japanese Office Action dated Jul. 23, 2019 (and English translation thereof) issued in counterpart Japanese Application No. 2017-526781.

Japanese Office Action dated Feb. 18, 2020 (and English translation thereof) issued in Japanese Patent Application No. 2017-526781.

\* cited by examiner

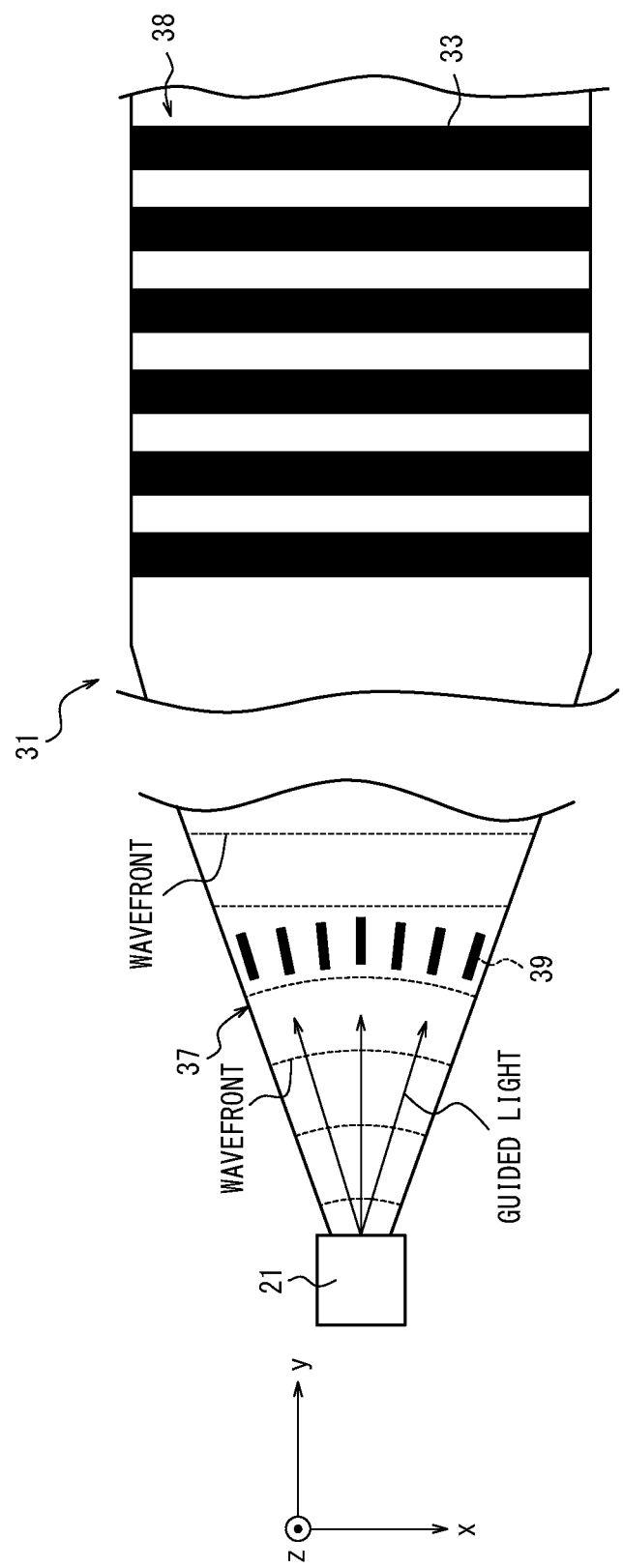

DIGITAL HOLOGRAPHIC IMAGING APPARATUS AND ILLUMINATION APPARATUS

CROSS-REFERENCE TO RELATED APPLICATION

The present application is a Continuing Application based on International Application PCT/JP2015/003424 filed on Jul. 7, 2015, the content of which is incorporated herein by reference.

TECHNICAL FIELD

The disclosure relates to a digital holographic imaging apparatus and an illumination apparatus available for use in the digital holographic imaging apparatus.

BACKGROUND

Digital holographic imaging apparatuses are known as disclosed in, tier example, in Patent Literatures (PTLs) 1 to 3. PTL 1 discloses a digital holographic imaging apparatus, which uses a half mirror to spatially separate light emitted from a light source into reference light and object illumination light, and uses the half mirror to have the reference light interfere with light reflected by an object irradiated with the object illumination light, to thereby generate an interference pattern, which is captured by an image sensor.

PTLs 2 and 3 disclose a digital holographic imaging apparatus, which irradiates light radiated from a light source onto a reflecting surface and an object, which are disposed in a substantially common optical path, and causes light reflected by the reflecting surface (reference light) to interfere with light reflected by the object (objet light), to thereby generate an interference pattern, which is captured by an image sensor.

CITATION LIST

Patent Literature

PTL JP3471556B
PTL 2: JP2013-228735A
PTL 3: JP2013-228736A

SUMMARY

The disclosed digital holographic imaging apparatus includes:

an illumination portion having: an illumination light emission surface for emitting, as illumination light, coherent light of a specific wavelength toward an object side; and a reference light emission surface located on the opposite side to the object side relative to the illumination light emission surface, the reference light emission surface emitting, as reference light, the coherent light in a direction opposite to the illumination light; and an image sensor located on the reference light emission surface side of the illumination portion, the image sensor imaging an interference pattern between object light and the reference light, the object light being part of the illumination light having been modulated by the object and passed through the illumination portion, the image sensor having a pixel array including two-dimensionally arranged pixels, wherein:
the illumination portion includes:
a light source portion that emits the coherent light; and
a plane optical waveguide portion that propagates the coherent light from the light source portion,
the plane optical waveguide portion includes:
a plane optical waveguide having a plane serving as the illumination light emission surface and a plane serving as the reference light emission surface,
the plane optical waveguide includes:
a grating part located between the illumination light emission surface and the reference light emission surface, the plane optical waveguide diffracting, while propagating, the coherent light by the grating part so as to emit the coherent light as the illumination light from the illumination light emission surface, and also emit the coherent light diffracted by the grating part as the reference light from the reference light emission surface.

Further, the disclosed illumination apparatus includes:
a light source portion that emits coherent light of a specific wavelength;
a plane optical waveguide having a first light emission plane for emitting, while propagating, the coherent light from the light source portion in a first direction, and a second light emission plane fir emitting the coherent light in a second direction opposite to the first direction;
a phase adjuster that adjusts the phase of the coherent light source portion; and
a light-adjusting plane optical waveguide located in tandem in a direction to be layered on the plane optical way eguide, the light-adjusting plane optical waveguide having a third light emission plane for emitting in the first direction, while propagating, the coherent light adjusted in phase by the phase adjuster, and a fourth light emission plane for emitting the coherent light in the second direction, while propagating the coherent light adjusted in phase by the phase adjuster.

BRIEF DESCRIPTION OF THE DRAWINGS

In the accompanying drawings.

FIG. 16A is an enlarged schematic diagram of the plane optical waveguide of Configuration Example 3 viewed from the z-direction;

DETAILED DESCRIPTION

Hereinafter, Embodiments of the disclosed digital holographic imaging apparatus are described, with reference to the drawings.

Embodiment 1

Figure 1:
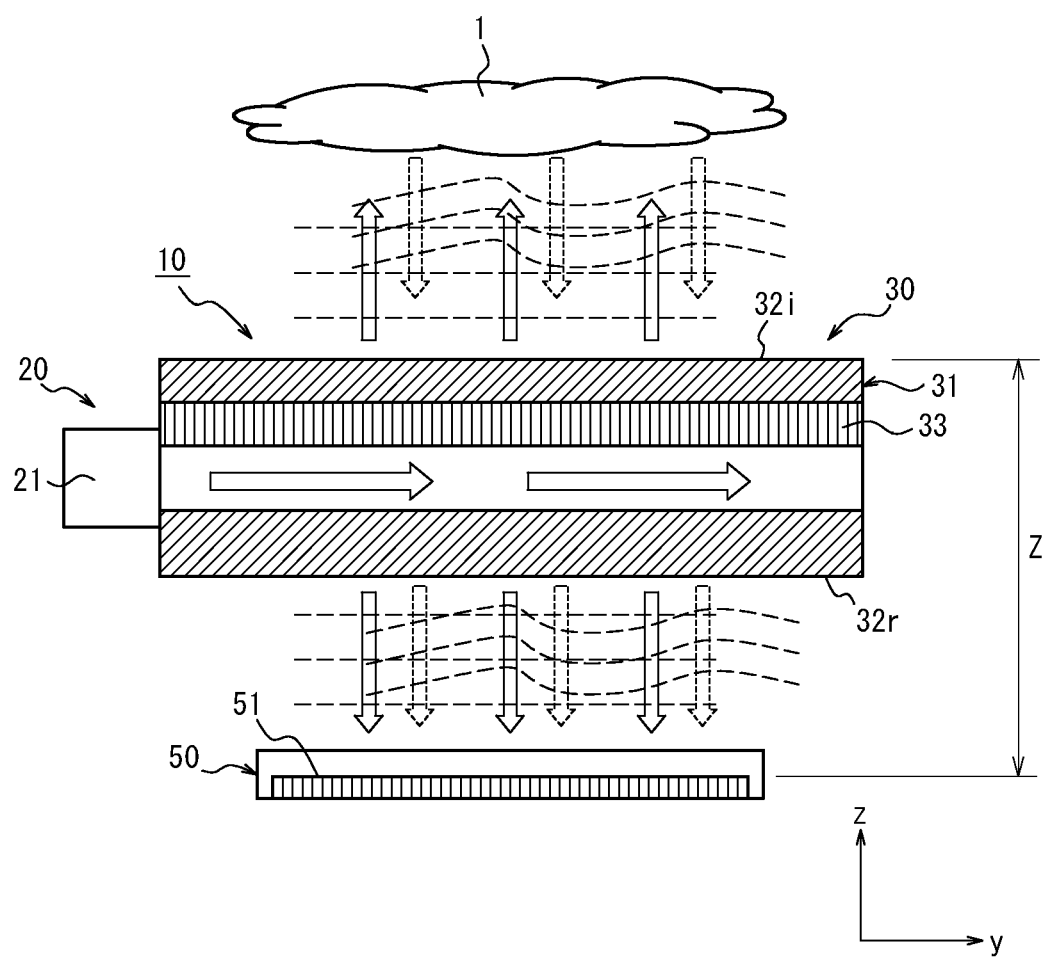
FIG. 1 is a schematic configuration diagram of an essential part of the disclosed digital holographic imaging apparatus according to Embodiment 1.

FIG. 1 is a schematic configuration diagram of an essential part of the disclosed digital holographic imaging apparatus according to Embodiment 1. The digital holographic imaging apparatus according to Embodiment 1 includes an illumination portion 10 and an image sensor 50. The illumination portion 10 includes a light source portion 20 and a plane optical waveguide portion 30.

The light source portion 20 is configured by including a light source 21 formed of, for example, one semiconductor laser which emits coherent light of specific wavelength. The light source 21 may be coupled to the plane optical waveguide portion 30 directly or via a light guide such as an optical fiber. FIG. 1 illustrates, by way of example, the light source 21 directly coupled to the plane optical waveguide portion 30.

The plane optical waveguide portion 30 is configured by including one plane optical waveguide 31 which propagates coherent light from the light source 21. The plane optical waveguide 31 has an illumination light emission surface 32$i$ and a reference light emission surface 32$r$ disposed opposite to the object side relative to the illumination light emission surface 32$i$. The illumination light emission surface 32$i$ emits, in a plane waveform, the coherent light from the light source 21, as illumination light toward the object side in a plane waveform. The reference light emission surface 32$r$ emits, in a plane waveform, the coherent light as reference light in a direction opposite to the illumination light. The illumination light emission surface 32$i$ and the reference light emission surface 32$r$ are each formed of a plane and extend parallel to each other.

The plane optical waveguide 31 has a grating part 33 located between the illumination light emission surface 32$i$ and the reference light emission surface 32$r$. The plane optical waveguide 31 diffracts coherent light from the light source 22 by the grating part 33 while propagating the coherent light, so as to emit the light as illumination light from the illumination light emission surface 32$i$, and also to emit the light as reference light from the reference light emission surface 32$r$. In other words, the illumination light and the reference light are both diffracted by the grating part 33 before being emitted outside the plane optical waveguide 31. FIG. 1 illustrates the plane optical waveguide 31 in section in the y-z plane where coherent light form the light source 21 is propagated in the y-direction and the normal of the illumination light emission surface 32$i$ and the reference light emission surface 32 is in the z-direction. The configuration of the plane optical waveguide is later described in detail.

The image sensor 50 is disposed as opposed to the reference light emission surface 32$r$ of the plane optical waveguide 31. The image sensor 50 includes a pixel array 51 two-dimensionally arranged along a plane substantially parallel to the reference light emission surface 32$r$.

In FIG. 1, illumination light in a plane waveform emitted from the illumination light emission surface 32$i$ is irradiated onto the object 1. The object 1 is formed of, for example, an opaque sample such as metal which reflects the illumination light, a high-density biological tissue sample, or an optical element. Illumination light reflected by the object 1 passes through the plane optical waveguide 31 as object light, and incident on the pixel array 51 of the image sensor as object light. Further, reference light in a plane waveform emitted from the reference light emission surface 32$r$ is incident on the pixel array 51. With this configuration, the object light reflected by the object 1 and the reference light not acting on the object 1 form an interference pattern on the pixel array 51. Accordingly, the interference pattern may be captured by the image sensor 50 and subjected to arithmetic processing, to thereby measure the shape of the object 1.

In FIG. 1, Embodiment 1 preferably satisfies: $0.0000001 < Z^2/S < 16$, where S represents the area of the illumination light emission surface 32$i$ and Z represents the distance from the illumination light emission surface 32$i$ to the pixel array 51 of the image sensor 50 of FIG. 1. Here, $Z^2/S$ of 0.0000001 or below makes it difficult to ensure the space to place the image sensor 50. Thus, $Z^2/S$ may be set to a value exceeding 0.0000001, preferably 0.001 or larger. However, $Z^2/S$ of 16 or above makes it difficult to attain size reduction, and thus, $Z^2/S$ may be less than 16, preferably 4 or lower, and more preferably 1 or lower. In Embodiment 1, the area S of the illumination light emission surface 32$i$ of the illumination portion 10 is larger than the square of the distance Z from the illumination light emission surface 32$i$ to the pixel array 51 of the image sensor 50, and thus, an interference pattern can be captured over a wide field of view. Further, the area of a region where the pixel array 51 of the image sensor 50 is disposed may preferably at least 0.8-fold of the area S of the illumination light emission surface 32$i$ in terms of achieving a wider field of view.

According to Embodiment 1, a wide imaging area can still be obtained even if the plane optical waveguide 31 is brought close to the object 1, which allows an interference pattern to be captured over a wide field of view with a compact configuration.

In FIG. 1, the solid arrow indicated in the plane optical waveguide 31 indicates the propagation direction of coherent light within the plane optical waveguide 31. The solid arrow extending from the illumination light emission surface 32i of the plane optical waveguide 31 toward the object 1 indicates illumination light. The solid arrow extending from the reference light emission surface 32r of the plane optical waveguide 31 toward the image sensor 50 indicates reference light. The broken arrow extending from the object 1 toward the image sensor 50 indicates object light. Broken lines each intersecting the illumination light, the object light, and the reference light, respectively, indicate the wavefront of each light. These expressions are similarly applied to other drawings.

Embodiment 2

Figure 2:
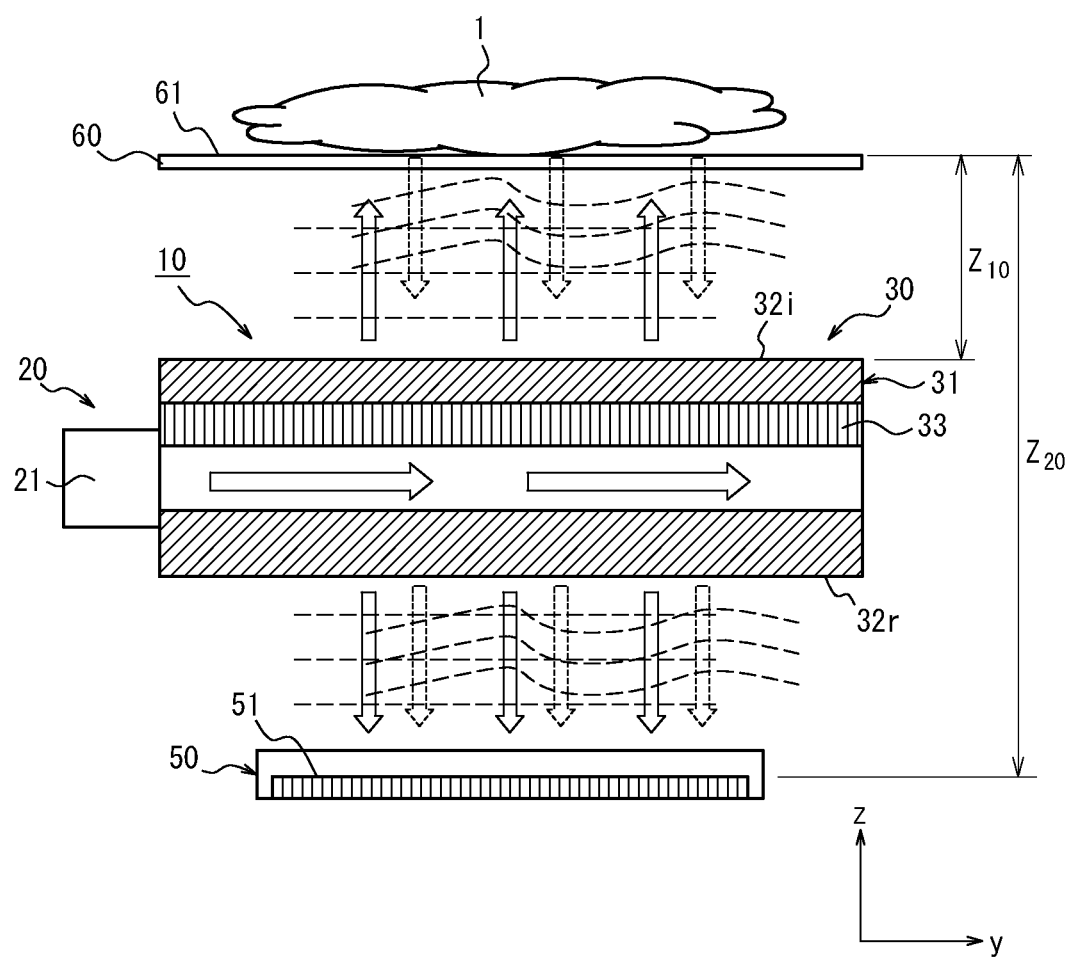
FIG. 2 is a schematic configuration diagram of an essential part of the disclosed digital holographic imaging apparatus according to Embodiment 2.

FIG. 2 is a schematic configuration diagram of an essential part of the disclosed digital holographic imaging apparatus according to Embodiment 2. The digital holographic imaging apparatus according to Embodiment 2 further includes, in the configuration of FIG. 1, an object holder 60 disposed on the object 1 side of the illumination portion 10, that is, on the illumination light emission surface 32i side.

The object holder 60 is formed like a flat plate of a material having transmitting property with respect to the illumination light emitted from the illumination portion 10, and disposed substantially parallel to the illumination light emission surface 32i. The object holder 60 is capable of detachably holding the object 1 on a surface (object contact surface) 61 opposite to the surface opposing to the illumination light emission surface 32i. The object holder 60 may be configured such that the object contact surface 61 is brought into contact with the object 1 in a separable manner, depending on the object 1.

In FIG. 2, Embodiment 2 preferably satisfies: $0.0000001 < Z_{10}^2/S < 4$; and $0.0000001 < Z_{20}^2/S < 4$, where S represents the area of the illumination light emission surface 32i of the illumination portion 10, $Z_{10}$ represents the distance from the illumination light emission surface 32i to the object contact surface 61 of the object holder 60, and $Z_{20}$ represents the distance from the object contact surface 61 to the pixel array 51 of the image sensor 50. Therefore, Embodiment 2 also satisfies $0.0000001 < Z^2/S < 16$ explained with reference to Embodiment 1. The rest of the configuration is similar to that of Embodiment 1, and thus the description thereof is omitted.

Here, $Z_{10}^2/S$ of 0.0000001 or below makes it difficult to ensure the space to place the object holder 60. Thus, $Z_{10}^2/S$ may be set to a value above 0.0000001, preferably 0.001 or larger. However, $Z_{10}^2/S$ of 4 or above makes it difficult to attain size reduction, and thus, $Z_{10}^2/S$ may be less than 4, preferably 1 or less, and more preferably 0.25 or less. $Z_{20}^2/S$ of 0.0000001 or below makes it difficult to ensure the space to dispose the image sensor 50. Thus, $Z_{70}^2/S$ may be set to a value above 0.0000001, preferably 0.001 or larger. However, $Z_{20}^2/S$ of 4 or above makes it difficult to attain size reduction, and thus, $Z_{20}^2/S$ may be less than 4, preferably 1 or less, and more preferably 0.25 or less. Further, $Z_{10}$ may preferably satisfy $0.25 < Z_{10}/Z_{20} < 4$.

According to Embodiment 2, a wide imaging area can still be obtained even if the object holder 60 is brought close to the object 1, which allows an interference pattern to be captured over a wide field of view with a compact configuration.

Embodiment 3

Figure 3:
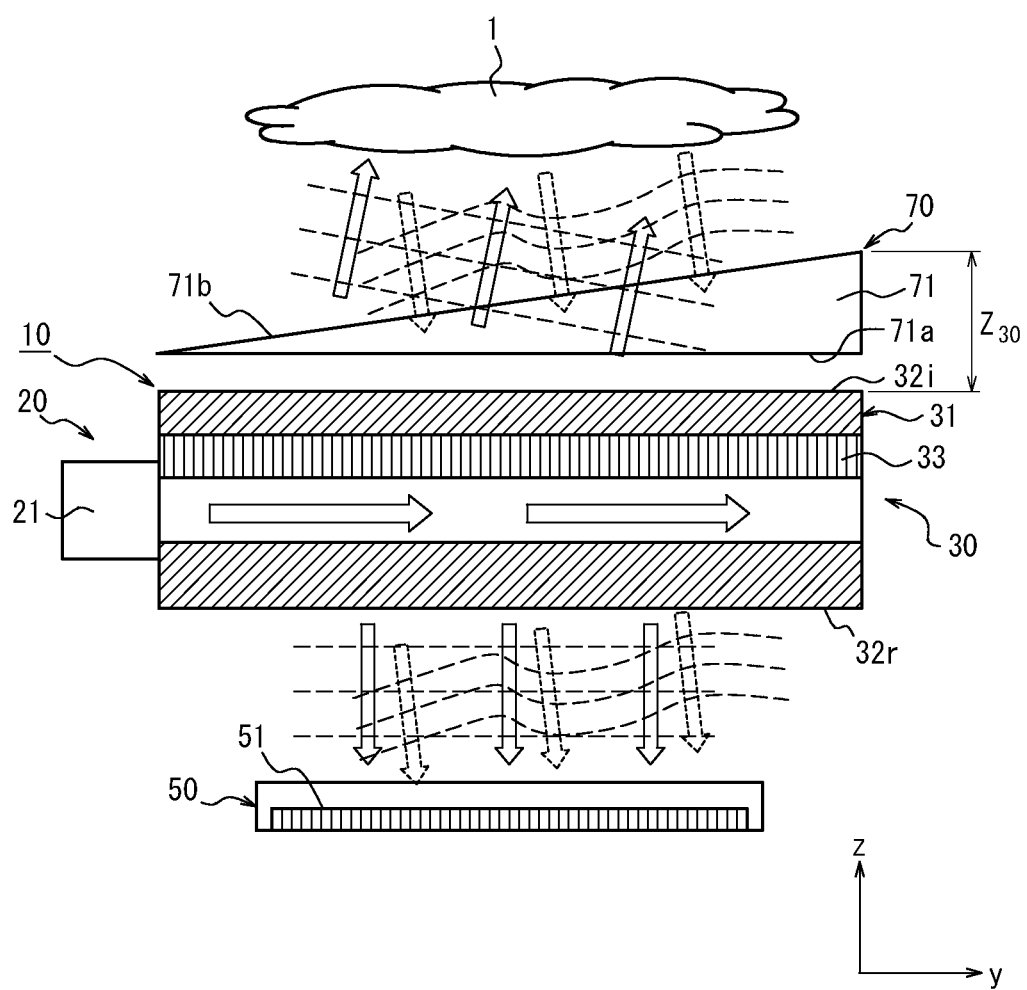
FIG. 3 is a schematic configuration diagram of an essential part of the disclosed digital holographic imaging apparatus according to Embodiment 3.

FIG. 3 is a schematic configuration diagram of an essential part of the disclosed digital holographic imaging apparatus according to Embodiment 3. The digital holographic imaging apparatus according to Embodiment 3 has an illumination light angle changer 70 disposed on the object 1 side of the illumination portion 10, that is, on the illumination light emission surface 32i side, in the configuration of FIG. 1.

The illumination light angle changer 70 is formed of a wedge prism 71 in a wedge shape in the y-z section. The wedge prism 71 has: a surface 71a spaced apart from and opposing substantially parallel to the illumination light emission surface 32i; and an inclined surface 71b inclined with respect to the illumination light emission surface 32i, in which the object 1 is disposed on the inclined surface 71b side. The wedge prism 71 is disposed to preferably have, for example, a distance $Z_{39}$ from the illumination light emission surface 32i to the maximum height of the inclined surface 71b of the wedge prism 71 which is set as $Z_{30} = Z_{10}$, to thereby satisfy the conditions similar to those of Embodiment 2.

In the aforementioned configuration, illumination light in a plane waveform emitted from the illumination light emission surface 32 is refracted by the inclined surface 71b of the wedge prism and irradiates the object 1 from a direction different from the emission direction from the illumination light emission surface 32i. In this manner, object light reflected by the object 1 to pass through the wedge prism 71 and the plane optical waveguide 31 is incident on the image sensor 50 at an angle different from that of the reference light emitted from the reference light emission surface, to thereby form an interference pattern having a frequency (carrier frequency) corresponding to the incident angles of the object light and of the reference light, on the image sensor 50. Therefore, the interference pattern may be captured by the image sensor 50, to thereby obtain, based on the output of the interference pattern, quantitative phase information by means of publicly-known Fourier fringe analysis, which allows for precise measurement of the shape of the object 1.

According to Embodiment 3, a wide imaging area can still be obtained even if the wedge prism 71 is brought close to the object 1, which allows an interference pattern to be captured over a wide field of view with a compact configuration. In addition, Embodiment 3 has a configuration similar to that of generating an off-axis hologram, which allows for precise measurement of the object 1.

Modified Example of Embodiment 3

Figure 4A:
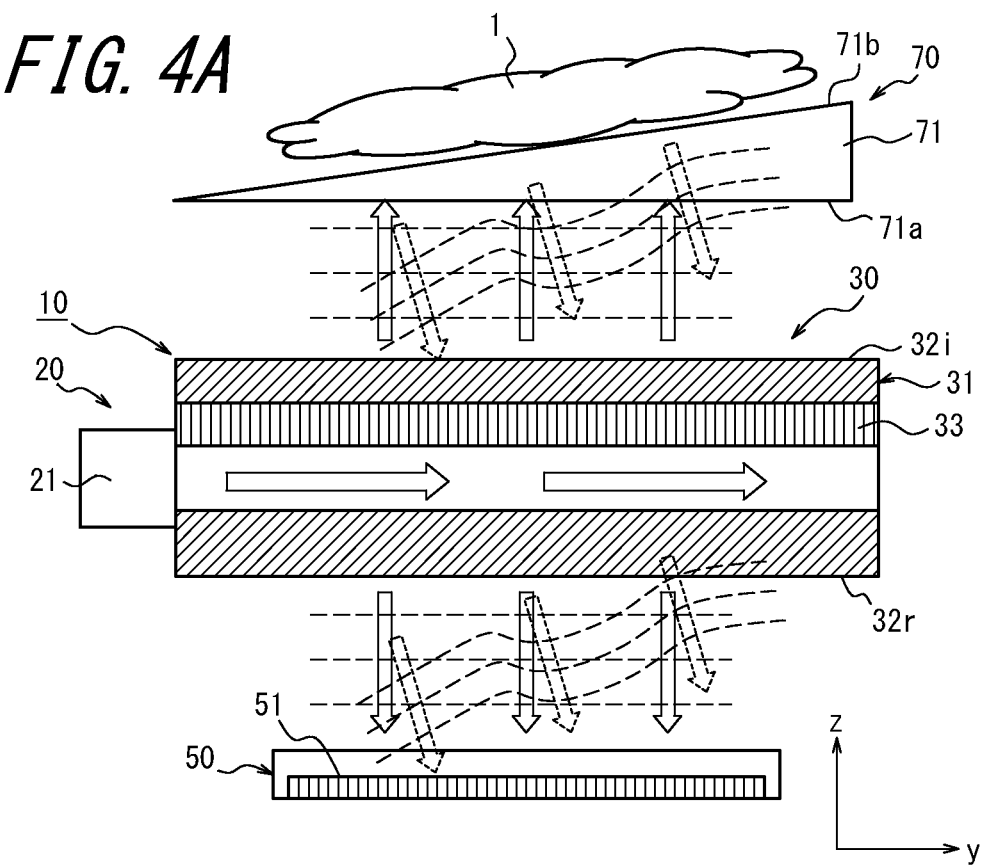
FIG. 4A illustrates a modified example of Embodiment 3.
Figure 4B:
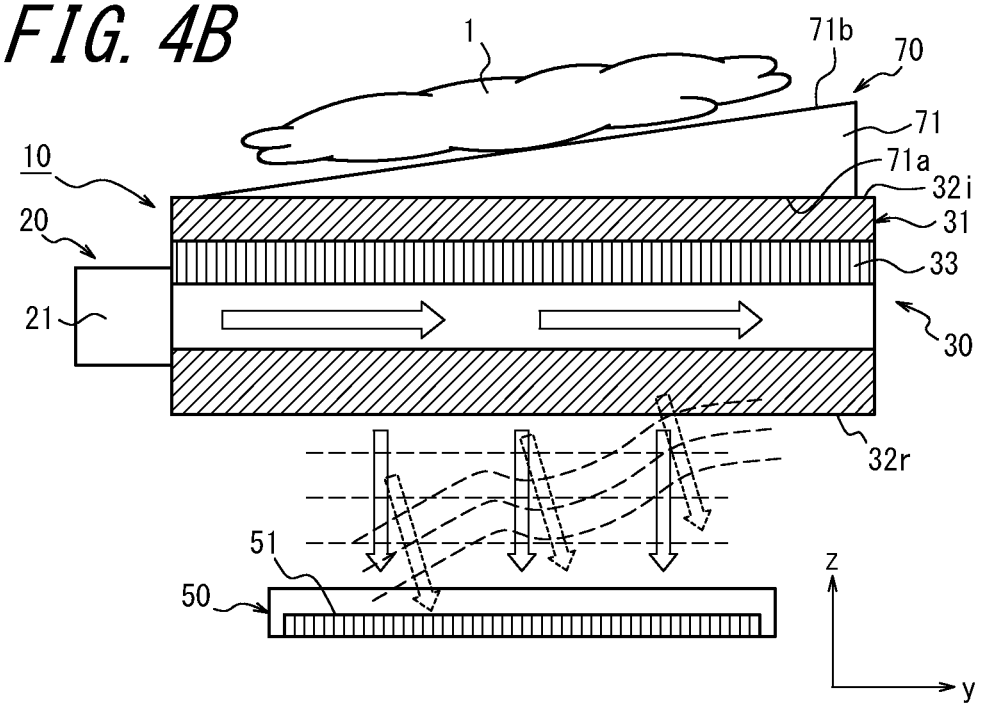
FIG. 4B illustrates another modified example of Embodiment 3.

FIGS. 4A and 4B each illustrate a modified example of Embodiment 3. In the digital holographic imaging apparatus of FIG. 4A, the wedge prism 71 of FIG. 3 is adapted to hold the object 1 on the inclined surface 71b thereof, so that the illumination light angle changer 70 is configured to serve as an object holder In the digital holographic imaging apparatus of FIG. 4B, the surface 71a of the wedge prism 71 is bonded to the illumination light emission surface 32i of the plane optical waveguide 31, to thereby hold the object on the inclined surface 71b of the wedge prism 71. In other words, in FIG.

4B, the illumination light angle changer 70 is configured to serve as an object holder, which is integrally formed with the illumination portion 10.

Therefore, the configurations of FIGS. 4A and 4B allow for, in addition to the effect similar to that of FIG. 3, holding the object 1 on the wedge prism 71 without separately providing an object holder, which can simplifies the configuration when an object holder is needed. Further, in FIG. 4B in particular, the illumination portion 10, the object holder, and the illumination light angle changer 70 are integrally formed, which is advantageous in size reduction.

Embodiment 4

Figure 5:
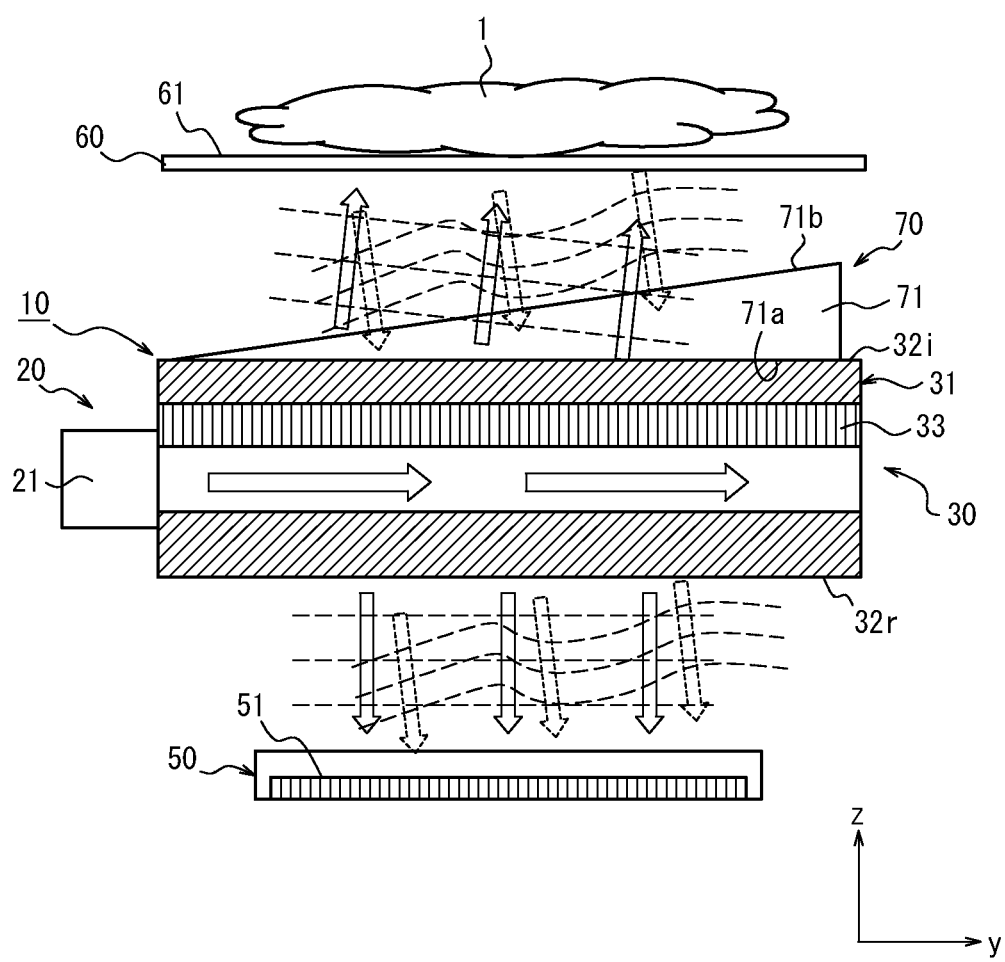
FIG. 5 is a schematic configuration diagram of an essential part of the disclosed digital holographic imaging apparatus according to Embodiment 4.

FIG. 5 is a schematic configuration diagram of an essential part of the disclosed digital holographic imaging apparatus according to Embodiment 4. The digital holographic imaging apparatus of Embodiment 4 is different from the configuration of FIG. 2 in that the wedge prism 71 is disposed between the illumination light emission surface 32i of the illumination portion 10 and the object holder 60, the wedge prism 71 forming the illumination light angle changer 70 explained in Embodiment 3. FIG. 5 illustrates, by way of example, a case where the surface 71a of the wedge prism 71 is bonded to the illumination light emission surface 32i such that the illumination portion 10 and the illumination light angle changer 70 are integrally formed.

The object holder 60 is disposed so as to preferably satisfy the conditions explained in Example 2 to thereby ensure the space to dispose the wedge prism 71. The rest of the configuration is similar to that of Embodiment 2, and thus the description thereof is omitted.

Embodiment 4 is also capable of obtaining quantitative phase information, as in Embodiment 3, to thereby precisely measure the shape of the object 1.

Modified Example of Embodiment 4

Figure 6:
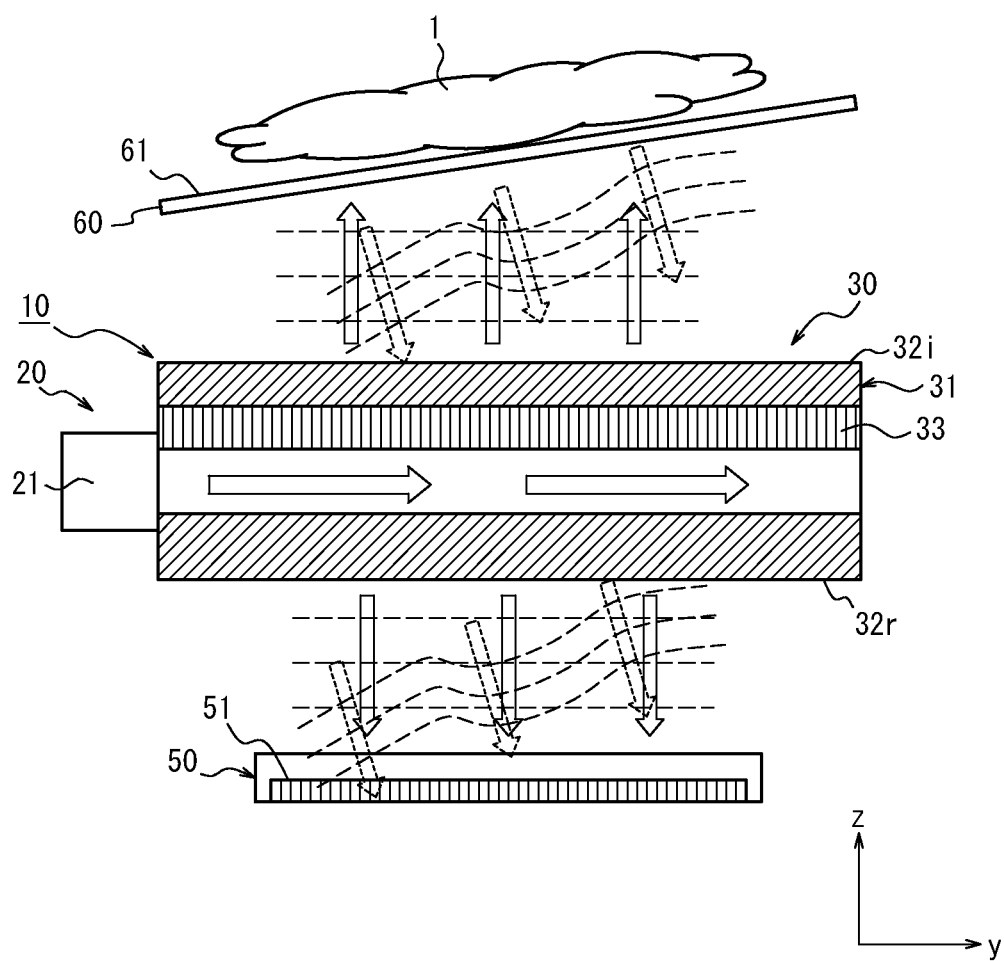
FIG. 6 illustrates a modified example of Embodiment 4.

FIG. 6 illustrates a modified example of FIG. 5. According to the digital holographic imaging apparatus of FIG. 6, the wedge prism 71 of FIG. 5 is omitted, and the object holder 60 is disposed as being inclined relative the illumination light emission surface 32i. In other words, the object holder 60 of FIG. 6 is configured to serve as the illumination light angle changer.

As compared with the configuration of FIG. 5, the configuration of FIG. 6 allows for eliminating the wedge prism 71, which can further reduce apparatus size and attain low cost.

Embodiment 5

Figure 7:
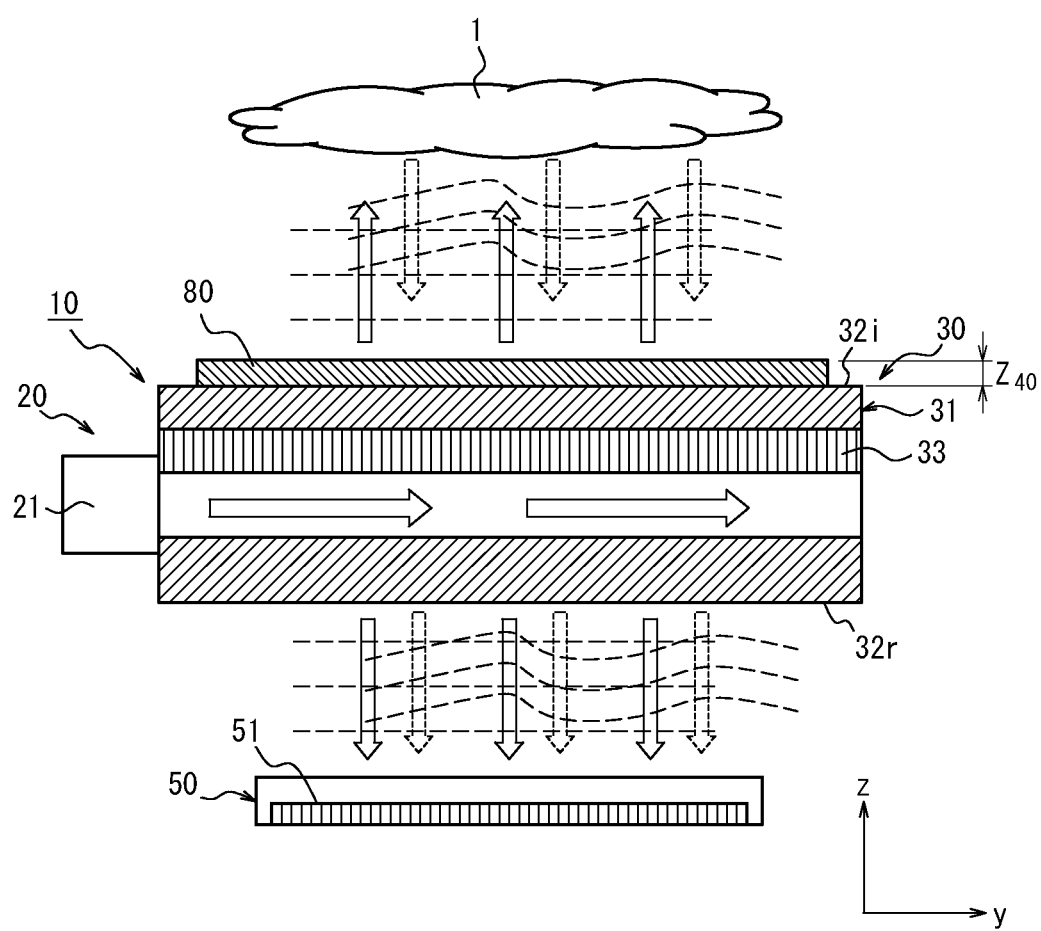
FIG. 7 is a schematic configuration diagram of an essential part of the disclosed digital holographic imaging apparatus according to Embodiment 5.

FIG. 7 is a schematic configuration diagram of an essential part of the disclosed digital holographic imaging apparatus according to Embodiment 5. The digital holographic imaging apparatus according to Embodiment 5 has a phase changer 80 disposed on the object 1 side of the illumination portion 10, that is, on the illumination light emission surface 32i side in the configuration of FIG. 1.

The phase changer 80 is configured to dynamically shift the phase of illumination light emitted from the illumination light emission surface 32i to be irradiated onto the object 1, and is formed of, for example, a liquid crystal device. The phase changer 80 is disposed to preferably satisfy $Z_{49}=Z_{10}$, where $Z_{40}$ represents, for example, the distance from the illumination light emission surface 32i to the surface on the object side of the phase changer 80, so as to satisfy the conditions similar to those of Embodiment 2. FIG. 7 illustrates, by way of example, a case where the phase changer 80 is disposed as coupled to the illumination light emission surface 32i.

In the aforementioned configuration, illumination light in a plane waveform emitted from the illumination light emission surface 32i is shifted in phase by the phase changer 80 before irradiating the object 1. In this manner, the object light reflected by the object 1 is modulated with reference to a phase different from that of reference light emitted from the reference light emission surface 32r, and further passes through the phase changer 80 to be phase-shifted, before passing through the plane optical waveguide 31, to thereby generate an interference pattern with the reference light, on the image sensor 50.

Accordingly, the phase changer 80 may sequentially change the phase shift amount of the illumination light so as to capture an interference pattern generated on the image sensor 50 in accordance with the respective phase shift amounts, to thereby analyze, based on the output of the interference pattern thus captured, the shape of the object 1 by a publicly-known phase shift method. As to the amount of sequential phase shift by the phase changer 80, the phase may randomly be shifted by an arbitrary amount, or by $\pi/4$ at a time so that the object light to be incident on the image sensor 50 may be modulated with reference to the phase shifted by 0, $\pi/2$, $\pi$, $3\pi/2$ with respect to the phase of the reference light.

According to Embodiment 5, a wide imaging area can still be obtained even if the phase changer 80 is brought close to the object 1, which allows an interference pattern to be captured over a wide field of view with a compact configuration. In addition, Embodiment 5 is capable of obtaining further quantitative phase information through the phase shift function of the phase changer 80, which allows for precise measurement of the object 1 and also high resolution measurement as compared with the configuration of the off-axis hologram.

Embodiment 6

Figure 8:
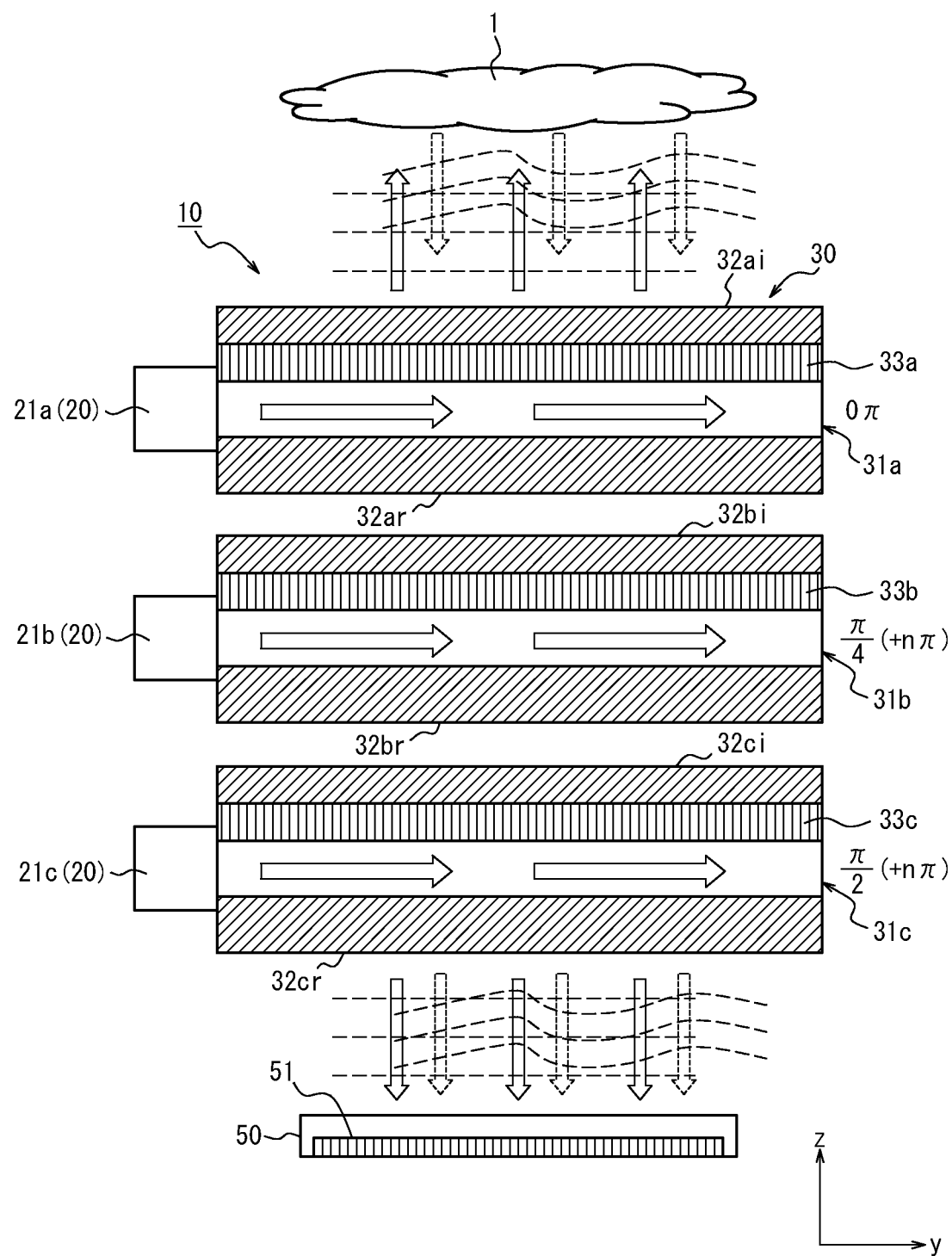
FIG. 8 is a schematic configuration diagram of an essential part of the digital holographic imaging apparatus according to Embodiment 6.

FIG. 8 is a schematic configuration diagram of an essential part of the digital holographic imaging apparatus according to Embodiment 6. The digital holographic imaging apparatus of Embodiment 6 is different from that of FIG. 7 in that the phase changer 80 is omitted and the plane optical waveguide portion 30 is configured by having a plurality of plane optical waveguides, so as to sequentially modulate the phase of illumination light. FIG. 8 illustrates, by way of an example, a case where three plane optical waveguides 31a, 31b, and 31c are used.

The plane optical waveguides 31a, 31b, and 31c are configured similarly to the plane optical waveguide 31 of FIG. 1. Accordingly, in FIG. 8, the same constituent elements as those of the plane optical waveguide 31 of FIG. 1 are denoted by the same suffix corresponding to the same reference symbols. The plane optical waveguides 31a, 31b, and 31c are disposed as being layered in tandem such that the reference light emission surface 32ar of the plane optical waveguide 31a is opposed to the illumination light emission surface 32bi of the plane optical waveguide 31b, and the reference light emission surface 32br of the plane optical waveguide 31b is opposed to the illumination light emission surface 32ci of the plane optical waveguide 31c.

Coherent lights of the same wavelength from the light source portion 20 are caused to be sequentially incident on the plane optical waveguides 31a, 31b, and 31c. The light source portion 20 diverges, fir example, coherent light emitted from one light source into three optical paths so as to cause the light to be incident on the plane optical waveguides 31a, 31b, and 31c by sequentially switching sequentially the light via a light guide such as an optical switch and an optical fiber. Alternatively, the light source portion 20 may have three light sources fir emitting coherent lights of the same wavelength, and the three light sources may be coupled to the plane optical waveguides either directly or a light guide such as an optical fiber, so as to cause coherent lights of the same wavelength to be sequentially incident from the three light sources onto the corresponding one of the plane optical waveguides 31a, 31b, and 31c. FIG. 8 illustrates, by way of example, a case where the three light sources 21a, 21b, and 21c are each coupled to the corresponding one of the plane optical waveguides 31a, 31b, and 31c, respectively, so as to cause coherent lights of the same wavelength to be sequentially incident onto the plane optical waveguides 31a, 31b, and 31c.

The object 1 is disposed on the illumination light emission surface 3ai side of the illumination optical waveguide 31a. The image sensor 50 is disposed on the reference light emission surface 32cr side of the plane optical waveguide 31c.

The plane optical waveguides 31a, 31b, and 31c are disposed to satisfy $0<\text{mod}(D,\lambda)<\lambda$, when either two of the plane optical waveguides are combined, where $\lambda$ represents the wavelength of coherent light emitted from the light sources 21a, 21b, and 21c, D represents the air conversion length for the distance between the grating parts of either two of the plane optical waveguides combined, and $\text{mod}(D, \lambda)$ represents the reminder after division of D by $\lambda$.

For example, with the plane optical waveguides 31a as the reference (0), the optical conversion length D for the distance between the grating part 33a of the plane optical waveguide 31a and the grating part 33b of the plane optical waveguide 31b is defined as $\lambda/8+n\lambda/2$. Here, n represents 0 or a positive integer. Such length corresponds to a phase of light of $\pi/4+n\pi$. The optical conversion length D for the distance between the grating part 33a of the plane optical waveguide 31a and the grating part 33c of the plane optical waveguide 31c is defined as $\lambda/4+n\lambda/2$. Such length corresponds to a phase of light of $\pi/2+n\pi$. Accordingly, in this case, the optical conversion length D for the distance between the grating part 33b of the plane optical waveguide 31b and the grating part 33c of the plane optical waveguide 31c is defined as $\lambda/8+n\lambda/2$.

Further, in FIG. 8, $0.0000001<Z2/S<16$ may preferably be satisfied as in Embodiment 1, where S represents the area of each of the illumination light emission surfaces 32ai, 32bi, 32ci of the plane optical waveguides 31a, 31b, 31c, and Z represents the distance from the illumination light emission surface 32ai of the plane optical waveguide 31a to the pixel array 51 of the image sensor 50.

In the aforementioned configuration, when coherent light is emitted from the light source 21a, reference light emitted from the reference light emission surface 32ai of the plane optical waveguide 31a sequentially passes through the plane optical waveguides 31b and 31c to be incident on the image sensor 50. Further, illumination light emitted from the illumination light emission surface 32ai of the plane optical waveguide 31a is reflected by the object 1 to be modulated, which reflected light (object light) passes through the own plane optical waveguide 31a before sequentially passing through the plane optical waveguides 31a and 31b to be incident on the image sensor 50. The phase difference between the reference light and the object on the image sensor 50 at this time is defined as the reference phase difference. In this manner, the image sensor 50 has an interference pattern generated thereon by the object light modulated by the illumination light at the reference phase difference with respect to the reference light.

Next, when coherent light is emitted from the light source 21b, reference light emitted from the reference light emission surface 32br of the plane optical waveguide 31b propagates a distance shorter than that of the reference light of the plane optical waveguide 31a by $\lambda/8(+n\lambda/2)$ in air conversion length, so as to be incident on the image sensor 50. Further, illumination light emitted from the illumination light emission surface 32bi of the plane optical waveguide 31b propagates a distance longer than that of the illumination light of the plane optical waveguide 31a by $\lambda/8(+n\lambda/2)$ in air conversion length, so as to be incident on the object 1. Reflected light (object light) that has been reflected by the object 1 to be modulated passes through the same optical path as the object light of the plane optical waveguide 31a. With this configuration, the image sensor 50 has an interference pattern formed thereon, with respect to reference light, the interference pattern being obtained by the object light modulated by illumination light having a phase difference of $\pi/2$ with respect to the reference phase difference. In other words, the phase difference between the reference light and the illumination light in this case will be different from the reference phase difference by $\pi/2$.

Next, when coherent light is emitted from the light source 21c, reference light emitted from the reference light emission surface 32cr of the plane optical waveguide 31c propagates a distance shorter than that of the reference light of the plane optical waveguide 31a by $\lambda/4(+n\lambda/2)$ in air conversion length, so as to be directly incident on the image sensor 50. Further, illumination light emitted from the illumination light emission surface 32ci of the plane optical waveguide 31c propagates a distance longer than that of the illumination light of the plane optical waveguide 31a by $\lambda/4(+n\lambda/2)$ in air conversion length, so as to be incident on the object 1. Reflected light (object light) that has been reflected by the object 1 to be modulated passes through the same optical path as the object light of the plane optical waveguide 31a. With this configuration, the image sensor 50 has an interference pattern formed thereon, with respect to reference light, the interference pattern being obtained by the object light modulated by illumination light having a phase difference of with respect to the reference phase difference. In other words, the phase difference between the reference light and the illumination light in this case will be different from the reference phase difference by $\pi$.

In Embodiment 6, interference patterns to be generated on the image sensor 50 in synchronous with the emission timing of the light sources 21a, 21b, and 21c may be captured, so as to allow for analyzing the shape of the object by a publicly-known phase shift method, as in the case of Embodiment 5, to thereby obtain the same effect as that of Embodiment 5. Further, in Embodiment 6, the phase is shifted depending on the layout of the plane optical waveguides 31a, 31b, and 31c, which is advantageous in that apparatus can be simply configured as compared to Embodiment 5. Though FIG. 8 illustrates, by way of example, the use of three plane optical waveguides 31a, 31b, and 31c, four or more plane optical waveguides may be used to capture interference patterns obtained for a larger number of phase combinations.

Embodiment 7

Figure 9:
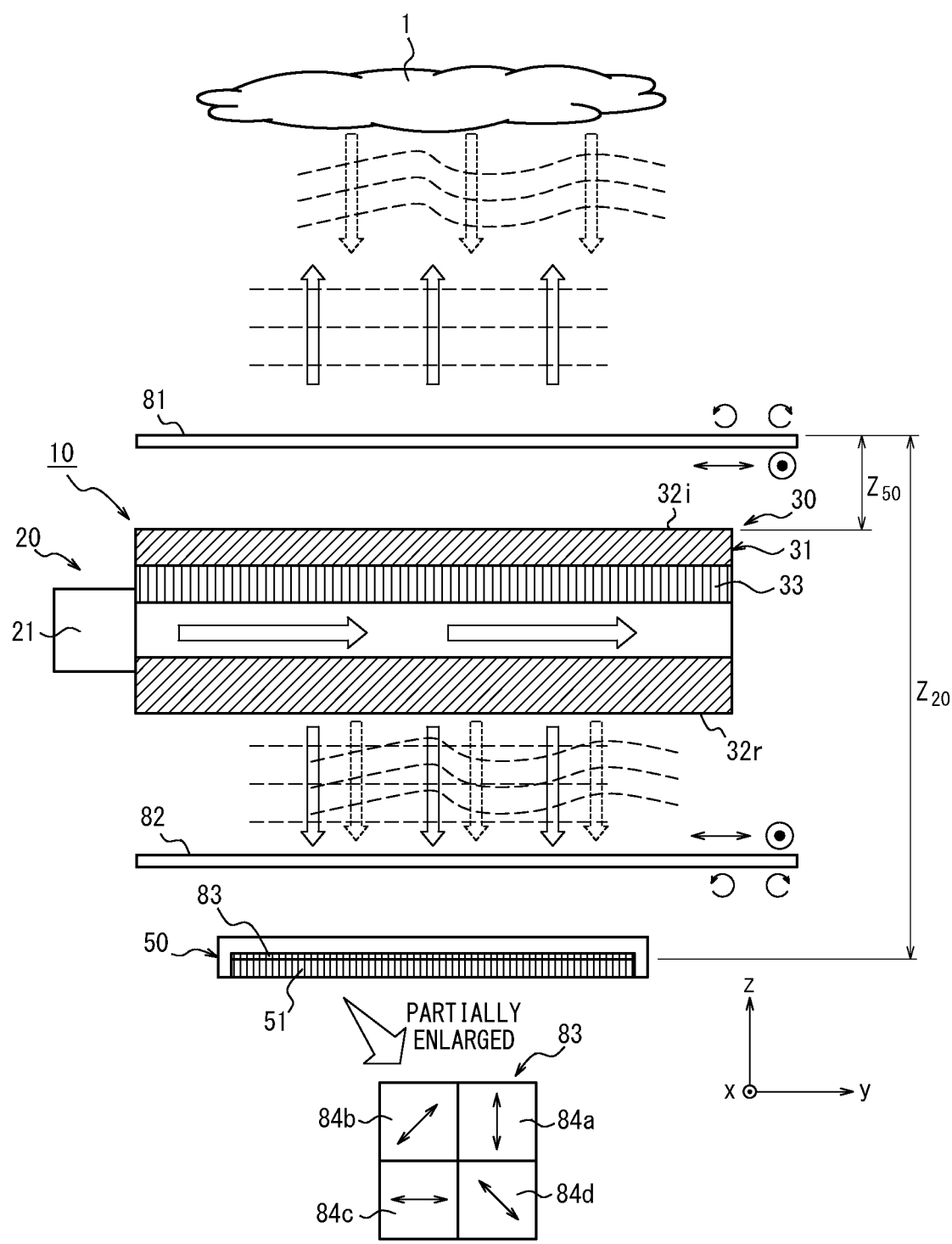
FIG. 9 is a schematic configuration diagram of an essential part of the disclosed digital holographic imaging apparatus according to Embodiment 7.

FIG. 9 is a schematic configuration diagram of an essential part of the disclosed digital holographic imaging apparatus according to Embodiment 7. The digital holographic imaging apparatus of Embodiment 7 includes, additionally to the configuration of FIG. 1, a first quarter-wave plate 81 disposed on the object 1 side of the illumination portion 10, that is, on the illumination light emission surface 32$i$ side, a second quarter-wave plate disposed in an optical path between the illumination portion 10 and the image sensor 50, and an analyzer array 83 disposed between the image sensor 50 and the second quarter-wave plate 82.

The analyzer array 83 is formed of a plurality of analyzers which are different from one another in polarization transmission direction and disposed side by side for every one or more pixels of the image sensor 50. In Embodiment 7, as also illustrated in the partially enlarged plan view of FIG. 9, a plurality of sets of the analyzers are disposed as being aligned, the sets each including four analyzers 84$a$ to 84$d$ of different transmission directions. The analyzers 84$a$ to 84$d$ each correspond to one or more pixels of the image sensor 50.

Here, the transmission directions of the four analyzers 84$a$ to 84$d$ in each set substantially coincide with: the y-direction; the x-direction; and the crystal axis directions of the first quarter-wave plate 81 and of the second quarter-wave plate 82, where, for example, the linear polarization direction of reference light emitted from the reference light emission surface 32$r$ of the plane optical waveguide 31 is defined in a direction (x-direction) orthogonal to the y-z plane. In other words, the transmission directions of the four analyzers 84$a$ to 84$d$ are each defined as 0, $\pi/2$, $\pi$, and $3\pi/2$, as being different from one another by $\pi/2$.

Further, the first quarter-wave plate 81 may be disposed to satisfy the conditions similar to those of Embodiment 2, when the distance from, for example, the illumination light emission surface 32$i$ to the surface on the object 1 side of the quarter-wave plate is $Z_{50}$, where $Z_{50}=Z_{10}$ is preferably established. Similarly, the second quarter-wave plate 82 may be disposed to preferably satisfy the condition of $Z_{20}$ explained with reference to Embodiment 2, so as to ensure the space to dispose the second quarter-wave plate 82.

In the aforementioned configuration, linearly polarized reference light in the x-direction emitted from the illumination light emission surface 32$i$ of the plane optical waveguide 31 passes through the first quarter-wave plate 81 to be converted into, for example, right-handed circular polarization, which is irradiated onto the object 1. Then, the object light reflected by the object 1 is converted into left-handed circular polarization turning in the opposite direction of the circular polarization of the incident illumination light, and further passes through the first quarter-wave plate 81 to be converted into linear polarization in the y-direction orthogonal to the linear polarization direction of illumination light emitted from the illumination light emission surface 32$i$. Then, the linear polarization in the y-direction passes through the plane optical waveguide 31, and further passes through the second quarter-wave plate 82, so as to be converted into, for example, left-handed circular polarization to be incident on the analyzer array 83.

Meanwhile, linearly polarized reference light in the x-direction emitted from the reference light emission surface 32$r$ of the plane optical waveguide 31 passes through the second quarter-wave plate 82, so as to be converted into left-handed circular polarization turning in the opposite direction of the circular polarization of the object light, which is irradiated onto the analyzer array 83.

As a result, when the object light and the reference light pass through the analyzer array 83, four interference patterns having phase relation of 0, $\pi/2$, $\pi$, and $3\pi/2$ with respect to the object light and the reference light are simultaneously generated. Accordingly, the interference patterns generated on the image sensor 50 may be captured, to thereby analyze, based on the output of the image sensor 50, the shape of the object 1 by a publicly-known parallel phase shift method.

According to Embodiment 7, a wide imaging area can still be obtained even if the first quarter-wave plate 81 is brought closer to the object 1, which allows an interference pattern to be captured over a wide field of view with a compact configuration. Further, Embodiment 7 is capable of simultaneously capturing a plurality of interference patterns that are different in phase relation with the object light and the reference light, to thereby analyze the object 1 at high speed with high accuracy.

Embodiment 8

Figure 10:
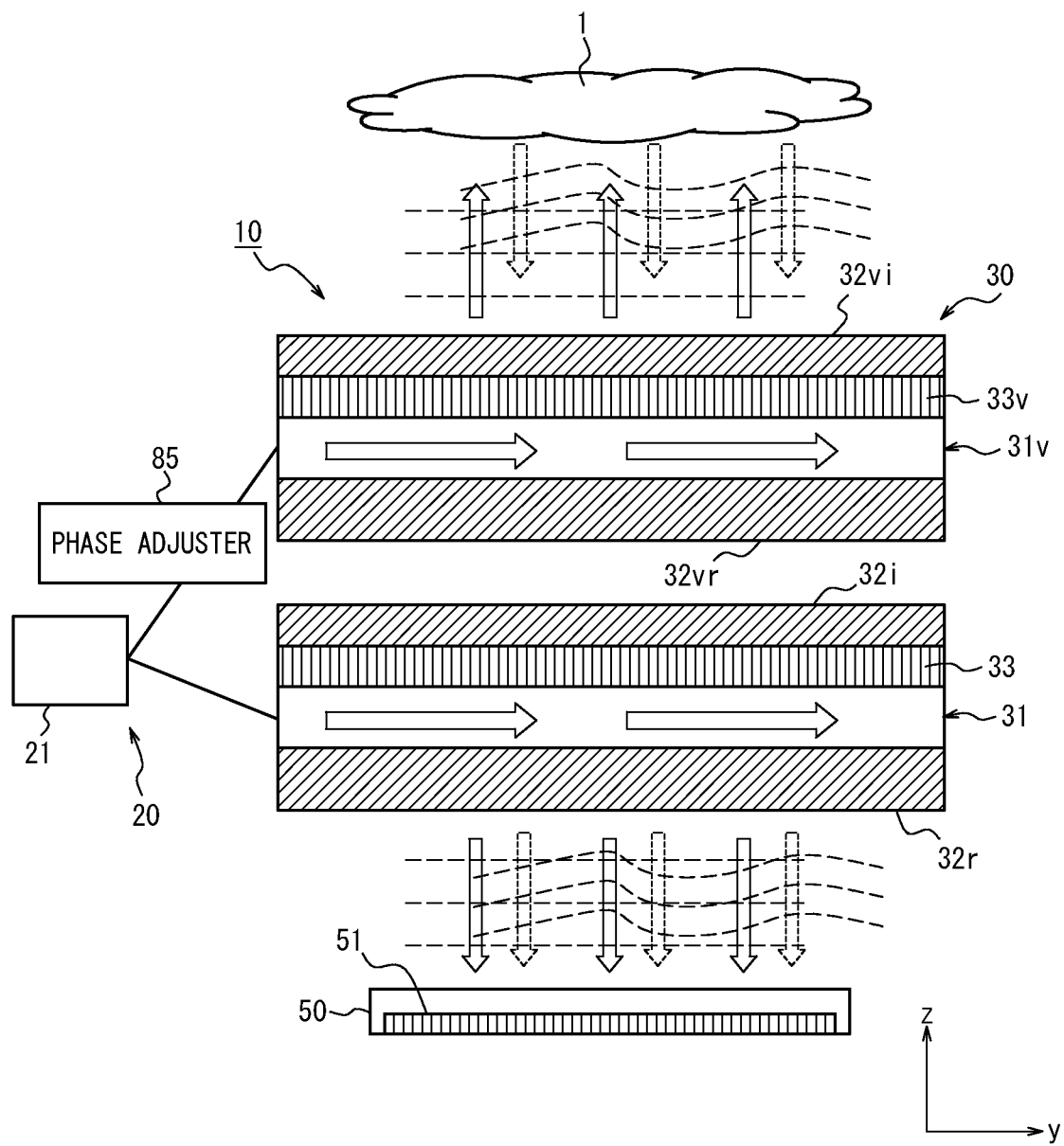
FIG. 10 is a schematic configuration diagram of an essential part of the disclosed digital holographic imaging apparatus according to Embodiment 8.

FIG. 10 is a schematic configuration diagram of an essential part of the disclosed digital holographic imaging apparatus according to Embodiment 8. In the digital holographic imaging apparatus of Embodiment 8, the illumination portion 10 further includes, in addition to the configuration of FIG. 1, a phase adjuster 85 and a light-adjusting plane optical waveguide 31V.

In Embodiment 8, two coherent lights of the same wavelengths are emitted from the light source portion 20. The two coherent lights may be emitted from two light sources or may be obtained by diverging coherent light emitted from one light source into two lights. FIG. 10 illustrates, by way of example, a case of diverging coherent light emitted from one light source 21 into two light fluxes.

Of the two coherent lights emitted from the light source portion 20, one is caused to incident on the plane optical waveguide 31 via a light guide such as an optical fiber, while the other is caused to incident on the phase adjuster 85. The phase adjuster 85 is configured by including, for example, an electro-optical element, an acousto-optic device, or a thereto-optic device, which are capable of adjusting the phase of incident light. The coherent light adjusted in phase by the phase adjuster 85 is caused to incident on the light-adjusting plane optical waveguide 31V via a light guide such as an optical fiber.

The light-adjusting plane optical waveguide 31V is configured similarly to the plane optical waveguide 31, and has an illumination light emission surface 32V$i$, a reference light emission surface 32V$r$, and a grating part 33V. The light-adjusting plane optical waveguide 31V is disposed between the image sensor 50 and the object 1, in tandem in a direction to be layered on the plane optical waveguide 31. For example, the light-adjusting plane optical waveguide 31V is disposed such that the air conversion length D between the grating part 33V and the grating part 33 of the plane optical waveguide 31 satisfies $\lambda/4(+n\lambda/2)$ ($\pi/2(+n\pi)$ in terms of phase).

The light-adjusting plane optical waveguide 31V propagates coherent light from the light source 21 incident thereon via the phase adjuster 85 and diffracts the light by the grating part 33, so as to emit the light as illumination light from the illumination light emission surface 32$i$ while emitting the light as reference light from the reference light emission surface 32$r$. In FIG. 10, the light-adjusting plane optical waveguide 31V is disposed on the illumination light emission surface 32$i$ side of the plane optical waveguide 31, which however may be disposed on the reference light emission surface 32$r$ side of the plane optical waveguide 31.

In FIG. 10, Embodiment 8 satisfies, similarly to Embodiment 1, $0.0000001<Z^2/S<16$, where S represents each of the area of the illumination light emission surface 32Vi of the light-adjusting plane optical waveguide 31V and the area of the illumination light emission surface 32i of the plane optical waveguide 31, and Z represents the distance from the illumination light emission surface 31Vi of the light-adjusting plane optical waveguide 31V to the pixel array 51 of the image sensor 50.

In the aforementioned configuration, when the light source 21 emits coherent light, illumination light emitted from the illumination light emission surface 32i of the plane optical waveguide 31 interferes with illumination light emitted from the illumination light emission surface 32Vi of the light-adjusting plane optical waveguide 31V, and reflected by the object 1. The amplitude of the interference light of the two illumination lights are determined in accordance with: the air conversion length D ($\pi/2(+n\pi)$ in phase) between the grating part 33V of the light-adjusting plane optical waveguide 31V and the grating part 33 of the plane optical waveguide 31; and the phase amount $\phi$ given by phase adjuster 85, Reflected light (object light) sequentially passes through the light-adjusting plane optical waveguide 31V and the plane optical waveguide 31 to be incident on the image sensor 50.

Meanwhile, reference light emitted from the reference light emission surface 32r of the plane optical waveguide 31 is emitted from the reference light emission surface 32Vr of the light-adjusting plane optical waveguide 31V and interferes with reference light having passed through the plane optical waveguide 31, before incident on the image sensor 50. The amplitude of the interference light of the two reference lights are determined in accordance with the air conversion length D ($-\pi/2(+n\pi)$ in phase) between the grating part 33V of the light-adjusting plane optical waveguide 31V and the grating part 33 of the plane optical waveguide 31; and the phase amount $\phi$ given by phase adjuster 85. As a result, the object lights based on the illumination lights each emitted from the plane optical waveguide 31 and the light-adjusting plane optical waveguide 31V and the reference lights each emitted from the plane optical waveguide 31 and the light-adjusting plane optical waveguide 31V, respectively, form an interference pattern on the image sensor 50. The phase difference codes generated by the air conversion length D between the grating part 33V of the light-adjusting plane optical waveguide 31V and the grating part 33 of the plane optical waveguide 31 are inverse between the illumination light and the reference light. Thus, the phase amount $\phi$ given by the phase adjuster 84 may be varied, to thereby change the ratio between the illumination light and the reference light.

In Embodiment 8, the phase adjuster 85 adjusts the phase of coherent light incident on the light-adjusting plane optical waveguide 31V so as to increase the contrast of the interference pattern generated on the image sensor 50.

According to Embodiment 8, a wide imaging area can still be obtained even if the light-adjusting plane optical waveguide 31V is brought closer to the object 1, which allows an interference pattern to be captured over a wide field of view with a compact configuration. Further, in Embodiment 8, the coherent light incident on the light-adjusting plane optical waveguide 31V can be adjusted in phase by the phase adjuster 85, to thereby adjust the contrast of the interference pattern to be generated, which allows for measuring, as the object 1, various objects having different reflectance values.

Note that Embodiment 8 may be applied to other Embodiments described above and also to modified examples. Here, in applying to Embodiment 6 of FIG. 8, one light-adjusting plane optical waveguide may be provided, or light-adjusting plane optical waveguides to be respectively paired with the plane optical waveguides 31a, 31b, and 31c may be provided. Alternatively, without providing a dedicated light-adjusting plane optical waveguide, the plane optical waveguides 31a, 31b, and 31c may be configured to serve as light-adjusting plane optical waveguides. For example, in the case of coupling a phase adjuster to each of the plane optical waveguides 31a, 31b, and 31c to thereby obtain an interference pattern, the phase adjuster coupled to the plane optical waveguide 31a may be turned off, so as to cause coherent light from the light source to be incident on the plane optical waveguide 31a without adjusting the phase thereof, while the coherent light from the light source may be adjusted in phase by the phase adjuster coupled to either one of the other plane optical waveguides 31a and 31c so as to be incident on the corresponding one of the plane optical waveguides 31a and 31c. Similarly, one of the coherent lights to be incident on two plane optical waveguides may be adjusted in phase.

Next, Configuration Examples of the plane optical waveguides of Embodiments above are described in detail. Here, the aforementioned plane optical waveguides 31, 31a, 31v. 31c, and the light-adjusting plane optical waveguides are similarly configured, and thus, description is given of the plane optical waveguide 31.

(Configuration Example 1 of Plane Optical Waveguide)

Figure 11:
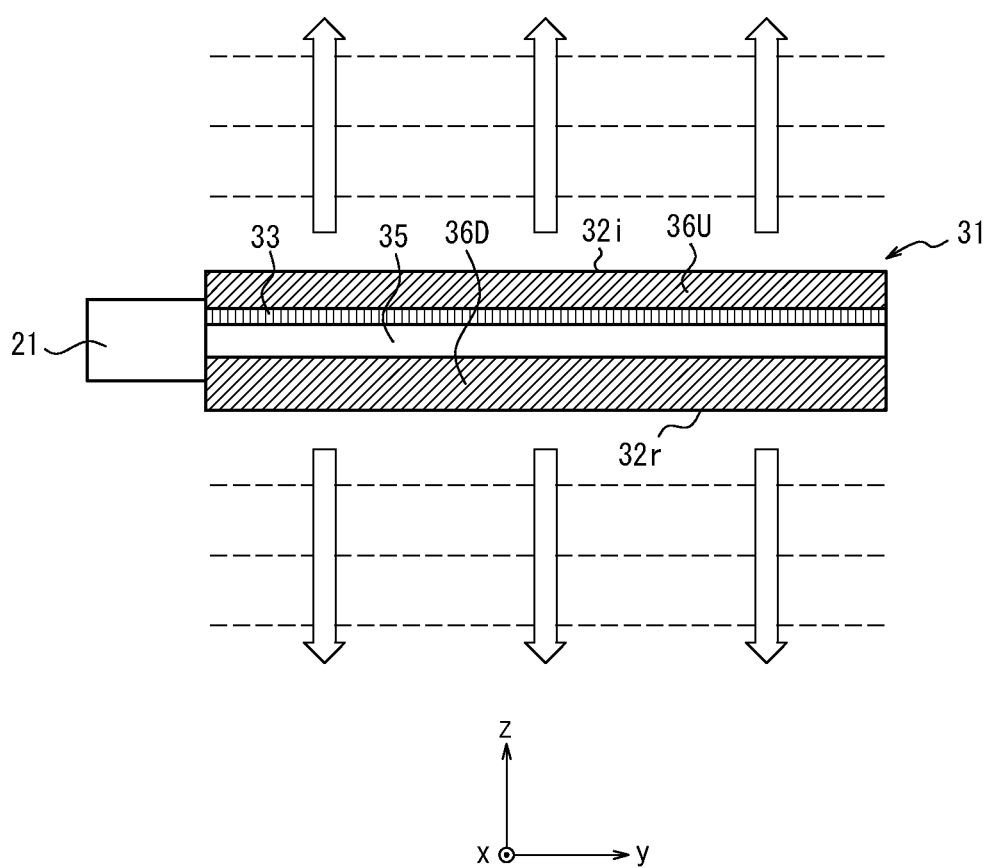
FIG. 11 is a schematic section of Configuration Example 1 of the disclosed the plane optical waveguide.

FIG. 11 is a schematic section of Configuration Example 1 of the disclosed plane optical waveguide 31. The plane optical waveguide 31 is configured by including: a core 35; a clad 36U on the upper side of the core 35; a clad 36D on the lower side of the core 35; and the grating part 33. The core 35 is formed to be in an arbitrary shape in section in the x-direction orthogonal to the y-z plane, such as, for example, a circular section, an oval section, or a rectangular section. The clads 36U and 36D are formed at least above and below of the emission region of illumination light, around the core 35 except for the both ends thereof in the y-direction. The clad 35U has a surface (upper surface) opposite to the core 35 corresponding to the grating part 33, the upper surface forming the illumination light emitting surface 32i, Similarly, the clad 36D has a surface (lower surface) opposite to the core 35 corresponding to the grating part 33, the lower surface forming the reference light emission surface 32r.

Figure 12A:
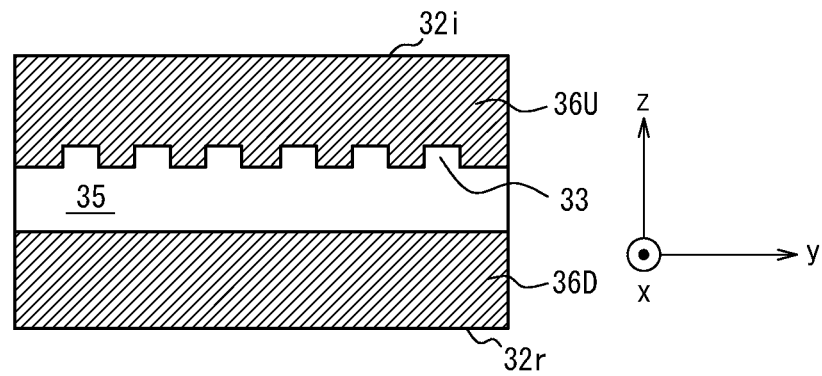
FIG. 12A is a diagram explaining a formation example of the grating of FIG. 11.
Figure 12B:
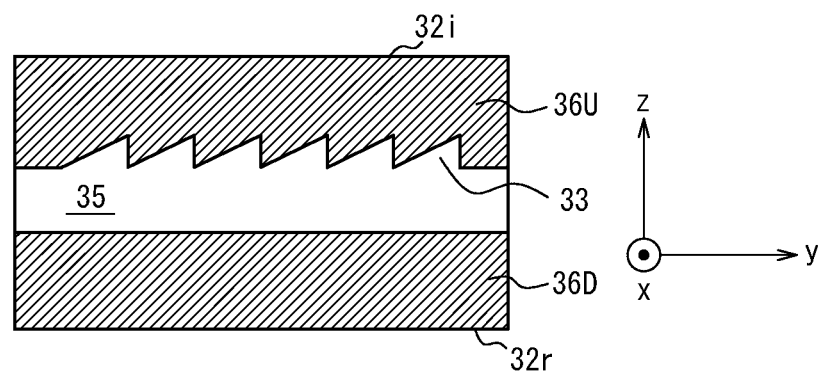
FIG. 12B is a diagram explaining a formation example of the grating of FIG. 11.
Figure 12C:
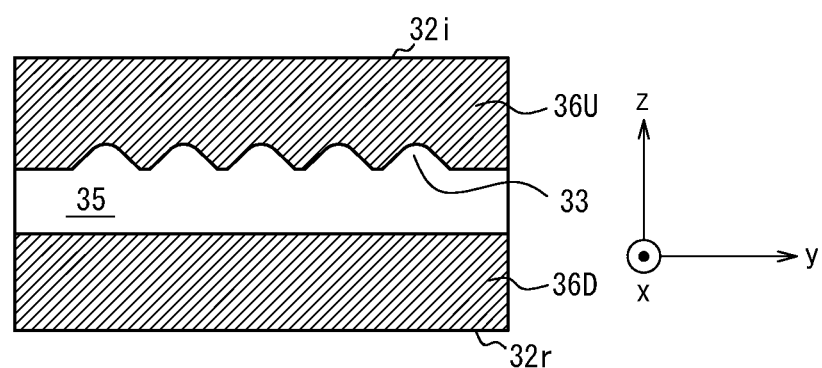
FIG. 12C is a diagram explaining a formation example of the grating of FIG. 11.
Figure 12D:
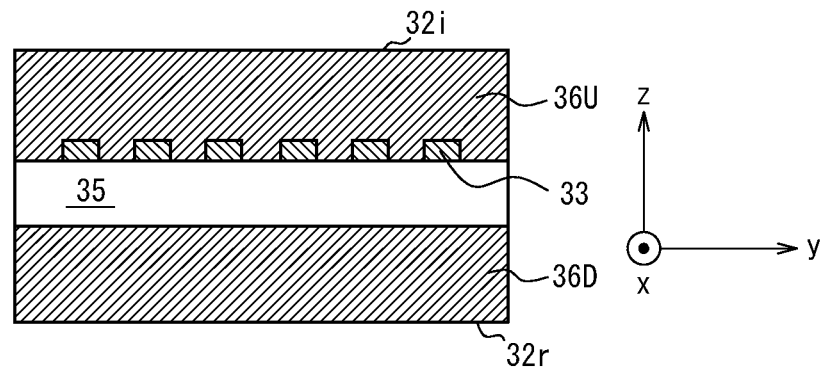
FIG. 12D is a diagram explaining a formation example of the grating of FIG. 11.

The grating part 33 is formed, between the illumination light emission surface 32i and the reference light emission surface 32r, at an interface between the core 35 and one of the clads (the clad 36U in FIG. 11) or inside the core 35 along the y-direction, so that coherent light propagating the plane optical waveguide 31 may be emitted in the z-direction. The grating part 33 may be formed of, for example, rectangular grooves illustrated in FIG. 12A, sawtooth grooves as illustrated in FIG. 12B, waveform grooves as illustrated in FIG. 12C, or rectangular grooves with different refractive indices as illustrated in FIG. 12D.

Figure 13:
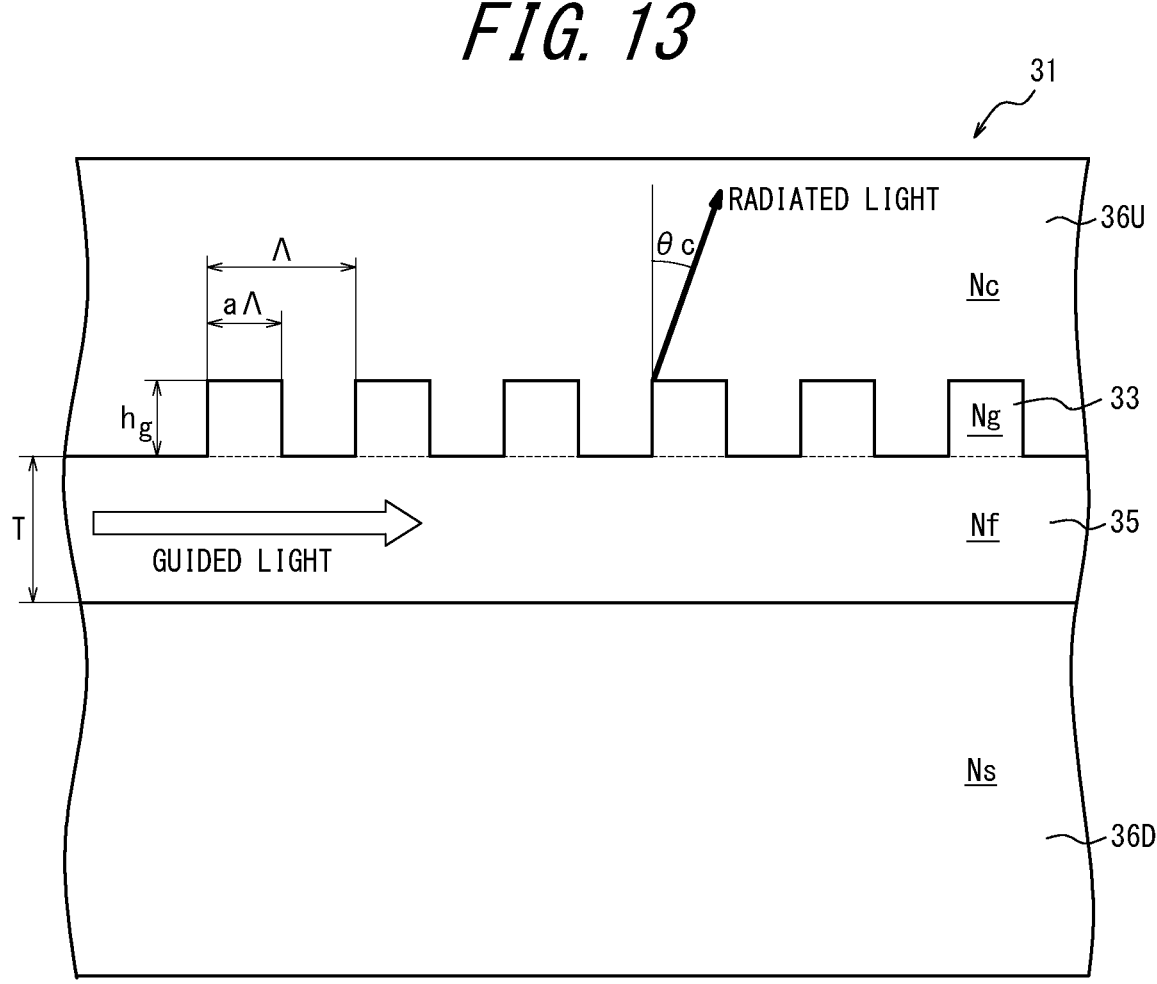
FIG. 13 explains the function of the plane optical waveguide of FIG. 11.

Next, the function of the plane optical waveguide 31 is described with reference to FIG. 13. The plane optical waveguide 31 of FIG. 13 is configured by including: the core 35 formed with a thickness 1' and a refractive index Nf on the clad 36D on the lower side with a refractive index Ns; the grating part 33 with a refractive index Ng, a period A, a grating factor a, and a height hg, which is formed at the boundary with respect to the core 35; and further the clad 36U on the upper side with a refractive index Nc, which is layered on the core 35. The clad 36D, the core 35, and the clad 36U form the plane optical waveguide 31.

In FIG. 13, coherent light (wavelength $\lambda$) caused to incident into the plane optical waveguide 31 repeats total reflection at the interface between the core 35 and the ds 36D and 36U that are different in refractive index, so as to be confined therewithin to propagate through inside the plane optical waveguide 31 in a certain propagation mode. In the coherent light propagating inside the plane optical waveguide 31, when the conditional expression (1) below is satisfied in a portion where the grating part 33 with a period A is disposed, the propagation mode and the radiation mode are coupled to each other. As a result, when coherent light having a propagation constant $\beta_0$ propagates inside the plane optical waveguide 31 in the y-direction, a spatial harmonic wave with a propagation constant $\beta_q$ in the y-direction is generated along with the coherent light. At this time, coherent light propagating inside the plane optical waveguide 31 is radiated outside from the illumination light emission surface 32$i$ and the reference light emission surface 32$r$ in the radiation mode at a radiation angle ($\theta$c), as a plane wave in a band shape (one-dimensional form) having an area.

$$Nc \cdot k_0 \cdot \sin\theta_c = \beta_0 + qK \quad (q = 0, \pm 1, \pm 2, \ldots) \quad (1)$$

$$\beta_0 = N_{\mathit{eff}} \cdot k_0$$

$$K = \frac{2\pi}{\Lambda}$$

where $k_0$ represents vacuum wave number, and $N_{\mathit{eff}}$ represents effective index of the coherent light.

The propagation mode of coherent light propagating through inside the plane optical waveguide 31 in the y-direction may be categorized into multimode propagation with a plurality of propagation constants and single mode propagation with only one propagation constant for the basic mode, depending on the parameter conditions (refractive index, thickness, wavelength) constituting the plane optical waveguide 31.

In the case of outputting only a plane wave of a specific radiation angle ($\theta$c) from the plane optical waveguide 31, the grating part 33 is formed with a period A which uniquely determine q in the expression (1) with respect a specific propagation mode, to thereby propagate single mode light. With this configuration, light is emitted outside the plane optical waveguide 31 in a specific radiation mode along with the propagated light, which eventually allows the plane optical waveguide to exclusively emit a plane wave with a specific radiation angle.

For example, when the propagating coherent light has an wavelength ($\lambda$) of $\lambda$=546.074 nm, the core 35 and the grating part 33 are each defined to have a refractive index (NO and a refractive index (Ng), respectively, which satisfy Nf=Ng=1.5354, the clads 36D and 36U are defined to have refractive indices (Ns, Nc) satisfying Ns=Nc=1.46008, and the grating part 33 is defined to have a period ($\Lambda$) of $\Lambda$=339 nm, to thereby form the plane optical waveguide 31. In this case, the plane optical waveguide 31 will have an effective refractive index $N_{\mathit{eff}}$ of $N_{\mathit{eff}}$=1.50788, and the radiation light will have a radiation angle ($\theta$c) of $\theta$c−4.0°. The grating factor a and height hg are defined as a=0.5, hg=50 nm. The radiation angle $\theta$c of the radiation light may be 0° as well.

The plane optical waveguide 31 according to Configuration Example 1 is capable of emitting coherent light in a desired direction over a wide field of view, with a thin and compact configuration.

(Configuration Example 2 of Plane Optical Waveguide)

The plane optical waveguide 31 of Configuration Example 2 is different from Configuration Example 1 in that the plane optical waveguide 31 is configured as a slab optical waveguide so as to emit illumination light and reference light of plane waves in a sheet form (two-dimensional form) in a desired direction.

Figure 14:
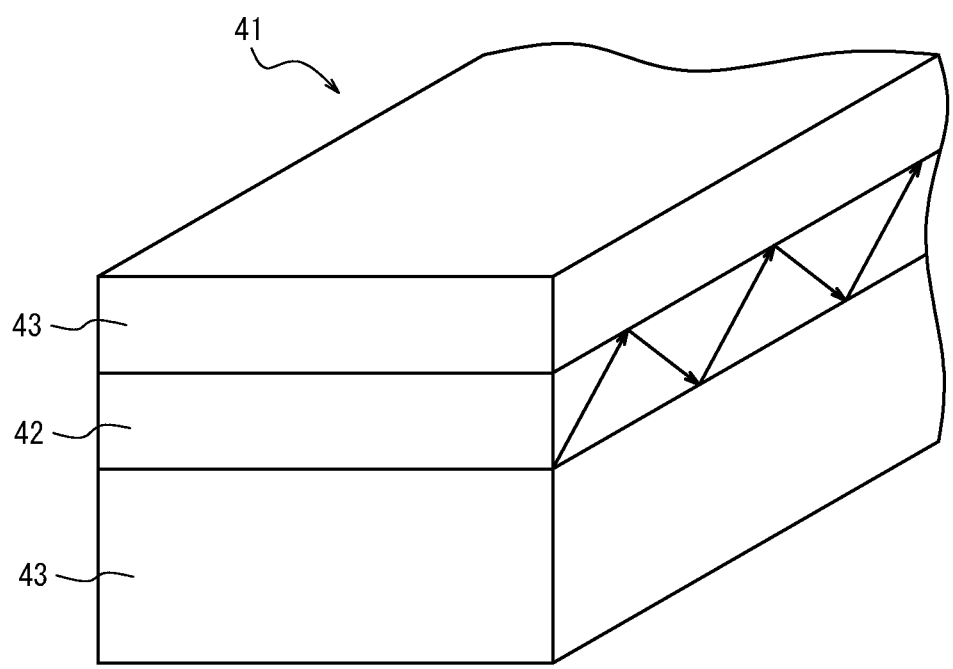
FIG. 14 illustrates a basic structure of a slab optical waveguide.
Figure 14:
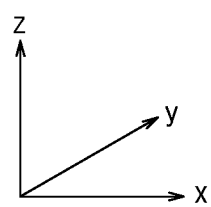

FIG. 14 illustrates a basic structure of a slab optical waveguide. The slab optical waveguide 41 has the core 42 in a plate shape, and the clad 43 layered on both sides of the core 42. In FIG. 14, when the propagation direction of illumination light is defined as y-direction, the thickness direction of the core is defined as z-direction, and a direction orthogonal to the y-direction and the z-direction is defined as x-direction, no clad is formed on both ends in the x-direction of the core 42 while the core 42 and the clad 43 bear refractive index difference in the z-direction. Light introduced into the core 42 from the y-direction is confined within the core 42 due to the refractive index difference between the core 42 and the clad 43 and propagated in the y-direction.

Figure 15A:
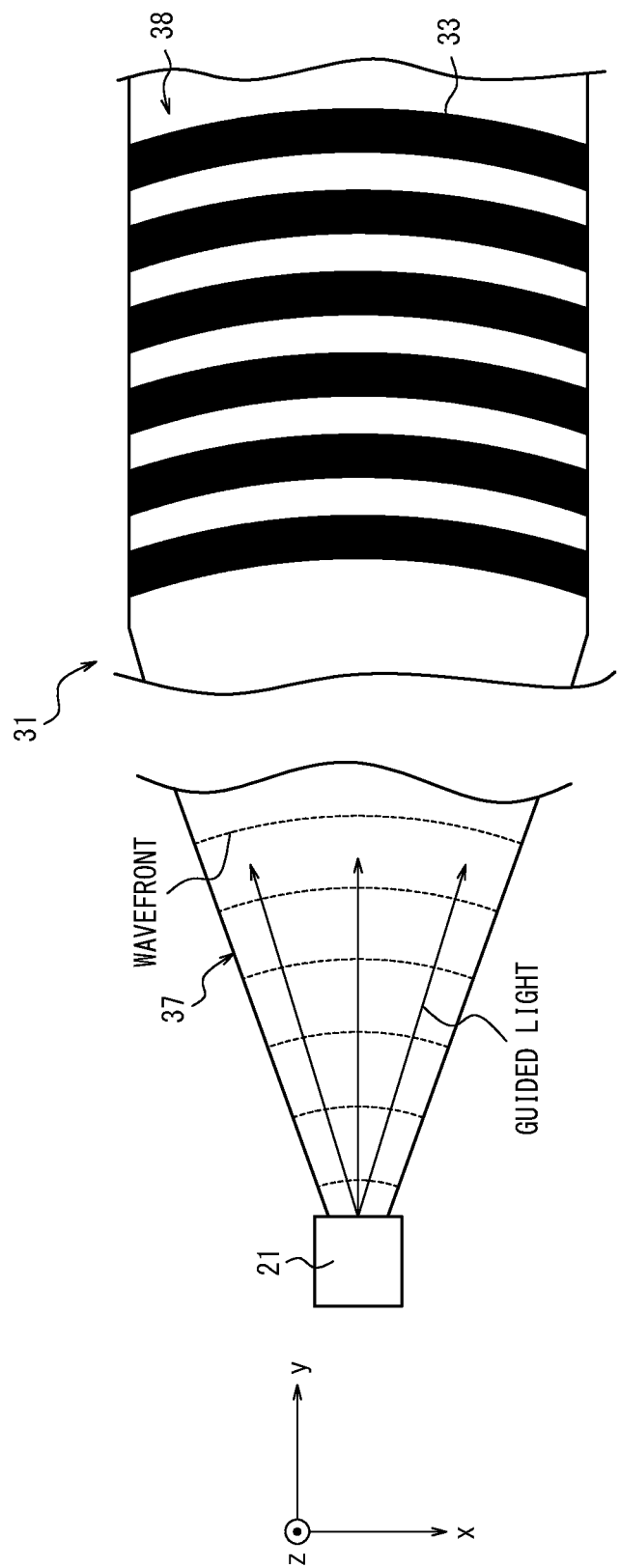
FIG. 15A is an enlarged schematic diagram of the plane optical waveguide of Configuration Example 2 viewed from the z-direction.
Figure 15B:
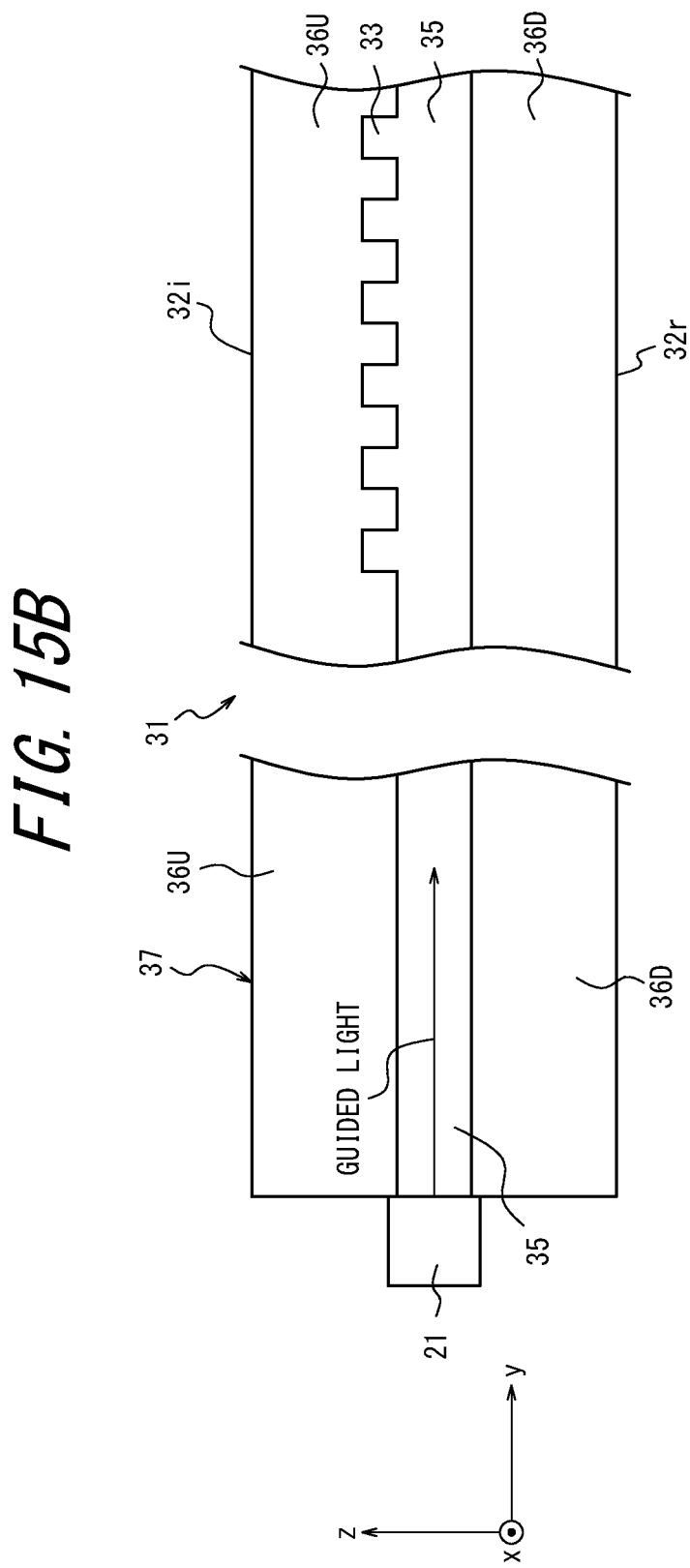
FIG. 15B is an enlarged schematic diagram of the plane optical waveguide of Configuration Example 2 viewed from the x-direction, with the slab optical waveguide of FIG. 15.

FIGS. 15A and 15B illustrate the plane optical waveguide 31 formed of a slab optical waveguide structure, where: FIG. 15A is an enlarged schematic diagram of the plane optical waveguide 31 viewed from the z-direction; and FIG. 15B is an enlarged schematic diagram viewed from the x-direction. The plane optical waveguide 31 includes: a tapered optical waveguide 37 that expands in one end to the other end; and a rectangular optical waveguide 38 coupled to the expanded other end of the tapered optical waveguide 37. The tapered optical waveguide 37 and the rectangular optical waveguide 38 both have the core 35 extending along the x-y plane and the clads 36U, 36D formed on both sides opposing to each other in the z-direction of the core 35, with the grating part 33 formed on the rectangular optical waveguide 38. The clad 36U has a surface (upper surface) opposite to the core 35 corresponding to the grating part 33, the upper surface forming an illumination light emission surface 32$i$. Similarly, the clad 36D has a surface (lower surface) opposite to the core 35 corresponding to the grating part 33, the lower surface forming a reference light emission surface 32$r$.

The tapered optical waveguide 37 and the rectangular optical waveguide 38 are, for example, integrally formed, and receive coherent light incident from an end face of the tapered optical waveguide 37, the end face being opposite to the rectangular optical waveguide 38. The tapered optical waveguide 37 of FIGS. 15A and 15B is illustrated, by way of example, as having the light source 11 coupled thereto, In FIGS. 15A and 151B, coherent light emitted from the light source 11 is confined in the z-direction in the tapered optical waveguide 37 and propagated in the y-direction. Further, coherent light incident on the tapered optical waveguide 37 is propagated as spreading in the x-direction as a spherical wave, so as to be enlarged in area. The grating part 33 is formed in a predetermined shape (rectangular in FIG. 15B) and with a predetermined period in the y-z plane, while being formed in a spherical shape in the x-y plane in line with the spherical wave of the coherent light.

The plane optical waveguide according to Configuration Example 2 is capable of emitting coherent light in a sheet shape with a large area in a desired direction over a wide field of view, with a thin and compact configuration.

(Configuration Example 3 of Plane Optical Waveguide)

Figure 16B:
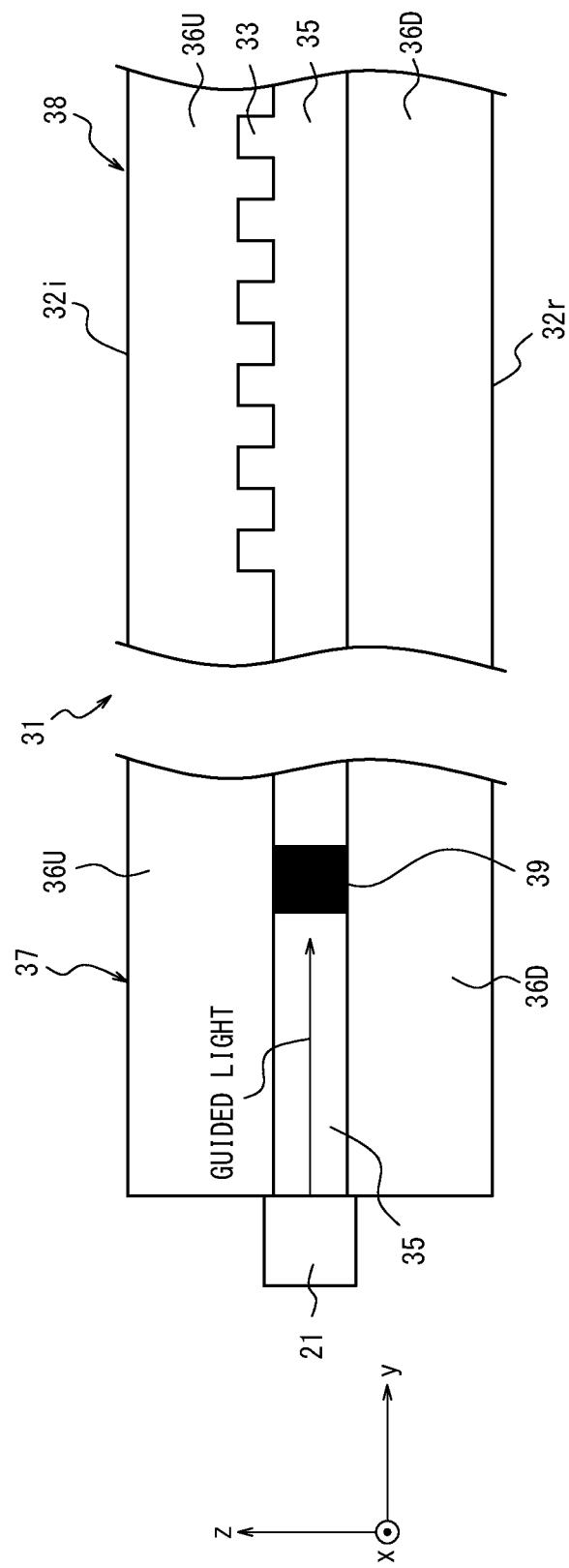
FIG. 16B is an enlarged schematic diagram of the plane optical waveguide viewed from the x-direction.

FIGS. 16A and 16B each are an explanatory diagram of Configuration Example 3 of the plane optical waveguide 31. Configuration Example 3 is different from Configuration Example 2 in that the tapered optical waveguide 37 has a conversion grating part 39 for converting the wave front of coherent light propagating therethrough.

FIGS. 16A and 16B are enlarged schematic diagrams of the plane optical waveguide 31 each viewed from the z-direction and the x-direction, respectively. The conversion grating part 39 is formed at an arbitrary position on the propagation path of coherent light in the tapered optical waveguide 37, and converts, in the x-y plane, illumination light propagating through the tapered optical waveguide 37 from spherical wave to plane wave. The grating part 33 on the rectangular optical waveguide 38 is formed in a predetermined shape (rectangle in the drawing) and with a predetermined period; in the x-y plane, and linearly formed in the x-y plane in line with the plane wave of the coherent light.

The plane optical waveguide 31 of Configuration Example 3 is capable of linearly forming, in the x-y plane, the grating part 33 of the rectangular optical waveguide 38 in line with the plane wave of the coherent light, which provides another advantage, in addition the effect of Configuration Example 2, in that the grating part 33 can be formed with ease.

(Configuration Example 4 of Plane Optical Waveguide)

Figure 17A:
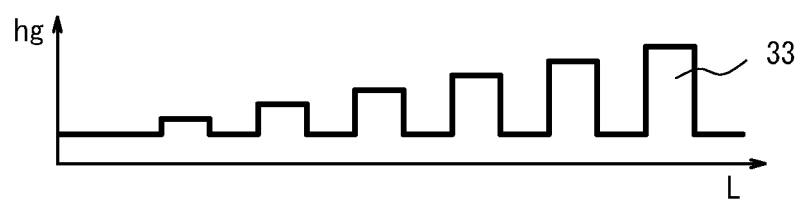
FIG. 17A explains the plane optical waveguide of Configuration Example 4.

FIG. 17A explains Configuration Example 4 of the plane optical waveguide 31. In Configuration Example 4 is different from Configuration Examples 1 to 3 in that the height hg of the grating part 33 is increased along with the increase of the grating length L in the propagation direction (y-direction) of illumination light.

Figure 17B:
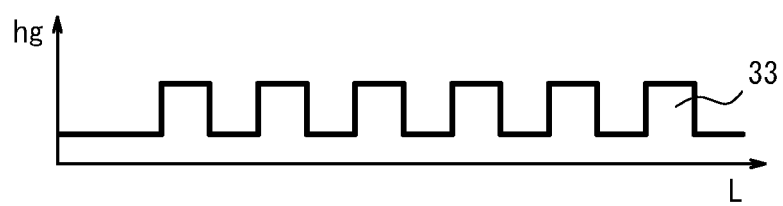
FIG. 17B illustrates a grating with a fixed height.
Figure 18:
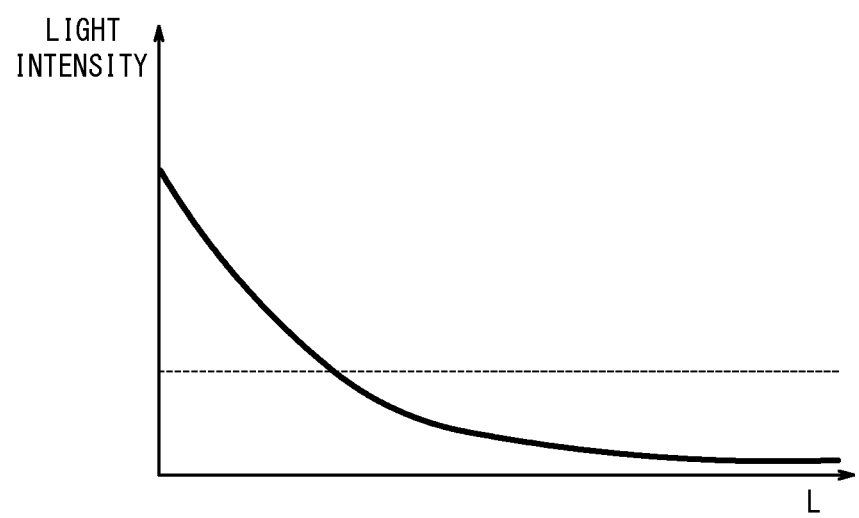
FIG. 18 is a graph illustrating an intensity distribution of illumination light diffracted by the gratings of FIGS. 17A and 17B.

Specifically, as illustrated in FIG. 17B, when the height hg of the grating part 33 is fixed over the grating length L, illumination light diffracted by the grating part 33 and emitted from the plane optical waveguide 31 has an intensity that exponentially attenuates along with the increase of the grating length L in the propagation direction of coherent light within the plane optical waveguide 31, as illustrated by the solid line of FIG. 18. Thus, in Configuration Example 4, the height hg of the grating part 33 is increased along with the increase of the grating length L as illustrated in FIG. 17, so that coherent light diffracted over the grating length has substantially constant intensity as indicated by the broken line of FIG. 18. The rest of the configuration is similar to those of Configuration Examples above.

Accordingly, when applied to Configuration Example 1, illumination light and reference light each in a plane waveform can be emitted in a longer band shape at a substantially constant intensity. When applied to Configuration Examples 2 to 3, illumination light and reference light each in a plane waveform can be emitted at a substantially constant intensity in a plane with a large area elongated in the propagation direction, over a wider field of view.

The disclosed apparatus is not limited to Embodiments above, and may be subjected to various modifications and alterations without departing from the gist of the disclosure. For example, with reference to FIG. 10, the disclosed apparatus may be configured as an illumination apparatus including: the light source portion 20; the plane optical waveguide 31; the phase adjuster 85; and the light-adjusting plane optical waveguide 31V, with the image sensor 50 being omitted. In this case, the illumination light emission surface 32i of the plane optical waveguide 31 corresponds to, for example, the first light emission plane, the emission direction of illumination light from the illumination light emission surface 32i corresponds to the first direction, the reference light emission surface 32r corresponds to, for example, the second light emission plane, the emission direction of reference light from the reference light emission plane 32r corresponds to the second direction, and the grating part 33 corresponds to the first grating part. Similarly, the illumination light emission surface 32Vi of the light-adjusting plane optical waveguide 31V corresponds to, for example, the third light emission plane, the reference light emission surface 32Vr corresponds to, for example, the forth light emission plane, and the grating part 33V corresponds to the second grating part.

Further, in the illumination portion, the plane optical waveguide portion may be formed of a plurality of plane optical waveguides which are layered so as to emit illumination light and reference light of the same wavelength from the plurality of plane optical waveguides, in the same direction or the different directions.

REFERENCE SIGNS LIST 1 object
10 illumination portion
20 light source portion
21 light source
30 plane optical waveguide portion
31, 31a, 31b, 31c, 31V plane optical waveguide
32i, 32ai, 32bi, 32ci, 32Vi illumination light emission surface
32r, 32ar, 32br, 32cr, 32Vr reference light emission surface
33, 33a, 33b, 33c, 33V grating part
50 image sensor
51 pixel array
60 object holder
61 object contact surface
70 illumination light angle changer
80 phase changer
81 first quarter-wave plate
82 second quarter-wave plate
83 analyzer array
85 phase adjuster

The invention claimed is:
1. A digital holographic imaging apparatus, comprising:
an illumination portion comprising: an illumination light emission surface for emitting, as illumination light, coherent light of a specific wavelength toward an object side; and a reference light emission surface located on the opposite side to the object side relative to the illumination light emission surface, the reference light emission surface emitting, as reference light, the coherent light in a direction opposite to the illumination light; and
an image sensor located on a reference light emission surface side of the illumination portion, the image sensor imaging an interference pattern between object light and the reference light, the object light being part of the illumination light having been modulated by the object and passed through the illumination portion, and the image sensor having a pixel array including two-dimensionally arranged pixels,
wherein:
the illumination portion further includes:
a light source portion that emits the coherent light; and
a plane optical waveguide portion that propagates the coherent light from the light source portion, wherein the plane optical waveguide portion includes a first material having a first refractive index and a second material having a second refractive index, wherein the first refractive index and the second refractive index are different from a refractive index of air, the plane optical waveguide portion includes:
a plane optical waveguide having a plane serving as the illumination light emission surface and a plane serving as the reference light emission surface,
the plane optical waveguide includes:
a grating part formed by an interface between the first material and the second material, wherein the interface is located between the illumination light emission surface and the reference light emission surface, the plane optical waveguide diffracting, while propagating, the coherent light by the grating part so as to emit the coherent light as the illumination light from the illumination light emission surface, and also emit the coherent light diffracted by the grating part as the reference light from the reference light emission surface,
the illumination portion further includes:
a phase adjuster that adjusts a phase of the coherent light from the light source portion; and
a light-adjusting plane optical waveguide that is located between the image sensor and the object, in tandem in a direction to be layered on the plane optical waveguide, and propagates the coherent light adjusted in phase by the phase adjuster, and
the light-adjusting plane optical waveguide has a plane serving as the illumination light emission surface and a plane serving as the reference light emission surface, and emits the coherent light, as the illumination light, from the illumination light emission surface and also emits the coherent light, as the reference light, from the reference light emission surface.

2. The digital holographic imaging apparatus according to claim 1, further comprising:
an illumination light angle changer that changes an irradiation angle of the illumination light emitted from the illumination light emission surface to be irradiated onto the object.

3. The digital holographic imaging apparatus according to claim 1, further comprising a phase changer disposed on the object side of the illumination portion, the phase changer changing a phase of the illumination light emitted from the illumination light emission surface to be irradiated onto the object.

4. The digital holographic imaging apparatus according to claim 1, wherein:
the plane optical waveguide portion includes:
at least three of the plane optical waveguides located in tandem in a direction of being layered between the image sensor and the object, the at least three of the plane optical waveguides satisfying the following condition when either two thereof are combined:

$$0 < \mathrm{mod}(D, \lambda) < \lambda,$$

where:
$\lambda$ represents the specific wavelength,
D represents an air conversion length of a distance between the gratings of the two plane optical waveguides combined, and
$\mathrm{mod}(D, \lambda)$ represents a remainder after a division of D by $\lambda$.

5. The digital holographic imaging apparatus according to claim 1, further comprising:
a first quarter-wave plate disposed on the object side of the illumination portion;
a second quarter-wave plate disposed in an optical path between the illumination portion and the image sensor; and an analyzer array disposed between the image sensor and the second quarter-wave plate, the analyzer array comprising a plurality of analyzers having different polarization transmission direction and disposed side by side for every one or more pixels of the image sensor.

6. The digital holographic imaging apparatus according to claim 1, wherein:
the light-adjusting plane optical waveguide has a grating part located between the illumination light emission surface and the reference light emission surface, and diffracts the coherent light by the grating part while propagating the coherent light and emits the coherent light as the illumination light from the illumination light emission surface, and also emits, as the reference light, the diffracted coherent light from the reference light emission surface.

7. The digital holographic imaging apparatus according to claim 1, wherein:
the pixel array of the image sensor is aligned in tandem along a plane substantially parallel to at least one of the illumination light emission surface and the reference light emission surface of the illumination portion.

8. The digital holographic imaging apparatus according to claim 1, further comprising an object holder that holds the object.

9. The digital holographic imaging apparatus according to claim 8, satisfying the following conditional expressions:

$$Z_{10}^2/S < 4,$$

$$0.0000001 < Z_{20}^2/S < 4,$$

where:
$Z_{10}$ represents a distance from the illumination light emission plane of the illumination portion to an object contact surface of the object holder,
$Z_{20}$ represents a distance from the object contact surface to the pixel array of the image sensor, and
S represents an area of the illumination light emission surface of the illumination portion.

10. The digital holographic imaging apparatus according to claim 9, satisfying $0.25 < Z_{10}/Z_{20} < 4$.

11. The digital holographic imaging apparatus according to claim 1, satisfying the following conditional expression:

$$0.0000001 < Z^2/S < 16,$$

where:
S represents an area of the illumination light emission surface of the illumination portion; and
Z represents a distance from the illumination light emission surface of the illumination light to the pixel array of the image sensor.

12. An illumination apparatus, comprising:
a light source portion that emits coherent light of a specific wavelength;
a plane optical waveguide having a first light emission plane for emitting, while propagating, the coherent light from the light source portion in a first direction, and a second light emission plane for emitting the coherent light in a second direction opposite to the first direction;
a phase adjuster that adjusts a phase of the coherent light from the light source portion; and
a light-adjusting plane optical waveguide located in tandem in a direction to be layered on the plane optical waveguide, the light-adjusting plane optical waveguide having a third light emission plane for emitting the coherent light in the first direction, and a fourth light emission plane for emitting the coherent light in the second direction, while propagating the coherent light adjusted in phase by the phase adjuster.

13. The illumination apparatus according to claim 12, wherein:
- the plane optical waveguide includes a first grating part located between the first light emission plane and a second light emission plane, and diffracts by the first grating part, while propagating, the coherent light, so as to emit the coherent light from the first light emission plane and the second emission plane in the first direction and the second direction, respectively,
- the light-adjusting plane optical waveguide includes a second grating part located between the third light emission plane and the fourth light emission plane, and diffracts by the second grating part, while propagating, the coherent light adjusted in phase by the phase adjuster, so as to emit the coherent light from the third light emission plane and the fourth light emission plane in the first direction and the second direction, respectively.

* * * * *